United States Patent
Tsurumi et al.

(10) Patent No.: US 8,643,598 B2
(45) Date of Patent: Feb. 4, 2014

(54) IMAGE PROCESSING APPARATUS AND METHOD, AND PROGRAM THEREFOR

(75) Inventors: Shingo Tsurumi, Saitama (JP); Shouichi Doi, Kanagawa (JP)

(73) Assignee: Sony Corporation, Tokyo (JP)

( * ) Notice: Subject to any disclaimer, the term of this patent is extended or adjusted under 35 U.S.C. 154(b) by 983 days.

(21) Appl. No.: 12/211,651

(22) Filed: Sep. 16, 2008

(65) Prior Publication Data
US 2009/0073117 A1 Mar. 19, 2009

(30) Foreign Application Priority Data
Sep. 19, 2007 (JP) ................................ P2007-241679

(51) Int. Cl.
*G09G 5/08* (2006.01)
(52) U.S. Cl.
USPC ............................. 345/158; 348/734; 715/810
(58) Field of Classification Search
USPC ............ 345/156–158; 348/699, 734; 715/810
See application file for complete search history.

(56) References Cited

U.S. PATENT DOCUMENTS

| | | | | |
|---|---|---|---|---|
| 4,988,981 A * | 1/1991 | Zimmerman et al. | ........ | 345/158 |
| 5,444,791 A * | 8/1995 | Kamada et al. | ........... | 382/190 |
| 5,594,469 A * | 1/1997 | Freeman et al. | ............. | 345/158 |
| 6,191,773 B1 * | 2/2001 | Maruno et al. | ................ | 345/158 |
| 6,498,628 B2 * | 12/2002 | Iwamura | ....................... | 348/734 |
| 6,501,515 B1 * | 12/2002 | Iwamura | ....................... | 348/734 |
| 6,624,833 B1 * | 9/2003 | Kumar et al. | ................. | 715/863 |
| 7,828,659 B2 * | 11/2010 | Wada | .............. | 463/36 |
| 7,849,421 B2 * | 12/2010 | Yoo et al. | ...................... | 715/863 |
| 7,869,646 B2 * | 1/2011 | Park et al. | ..................... | 382/154 |
| 2002/0054175 A1 * | 5/2002 | Miettinen et al. | ............ | 345/863 |
| 2004/0190776 A1 * | 9/2004 | Higaki et al. | ................. | 382/190 |
| 2005/0162402 A1 * | 7/2005 | Watanachote | ................ | 345/173 |
| 2006/0061548 A1 | 3/2006 | Kitaura | | |
| 2006/0136846 A1 * | 6/2006 | Im et al. | ....................... | 715/863 |
| 2006/0209021 A1 | 9/2006 | Yoo et al. | | |
| 2007/0229663 A1 * | 10/2007 | Aoto et al. | .................... | 348/155 |
| 2008/0231926 A1 * | 9/2008 | Klug et al. | ..................... | 359/23 |
| 2008/0285807 A1 * | 11/2008 | Lee et al. | ...................... | 382/107 |
| 2010/0079677 A1 * | 4/2010 | Matsubara et al. | .......... | 348/699 |

(Continued)

FOREIGN PATENT DOCUMENTS

EP 0 823 683 A1 2/1998
JP 04-127674 4/1992

(Continued)

OTHER PUBLICATIONS

"Detection of an Image Feature Point using the SUSAN Operator"; http://www.oita-ri.go.jp/report/2002/2002_12.pdf.

(Continued)

*Primary Examiner* — Amare Mengistu
*Assistant Examiner* — Premal Patel
(74) *Attorney, Agent, or Firm* — Finnegan, Henderson, Farabow, Garrett & Dunner, LLP

(57) ABSTRACT

An image processing apparatus includes an extracting unit configured to extract a feature point from a captured image; a recognizing unit configured to recognize a position of the feature point; a display control unit configured to perform control, based on the position of the feature point, to display a feature-point pointer indicating the feature point; and an issuing unit configured to issue, based on the position of the feature point, a command corresponding to the position of the feature point or a motion of the feature point.

8 Claims, 24 Drawing Sheets

(56) References Cited

U.S. PATENT DOCUMENTS

| | | | |
|---|---|---|---|
| 2010/0275159 A1* | 10/2010 | Matsubara et al. | 715/810 |
| 2011/0074669 A1* | 3/2011 | Marks et al. | 345/156 |
| 2011/0080254 A1* | 4/2011 | Tran et al. | 340/5.1 |
| 2011/0083112 A1* | 4/2011 | Matsubara et al. | 715/863 |

FOREIGN PATENT DOCUMENTS

| | | |
|---|---|---|
| JP | 04-271423 | 9/1992 |
| JP | 05-260379 | 10/1993 |
| JP | 06-301474 | 10/1994 |
| JP | 06-301476 | 10/1994 |
| JP | 07-141101 | 6/1995 |
| JP | 8-44490 | 2/1996 |
| JP | 09-035066 | 2/1997 |
| JP | 09-128141 | 5/1997 |
| JP | 09-237151 | 9/1997 |
| JP | 09-265346 | 10/1997 |
| JP | 11-305895 | 11/1999 |
| JP | 2002-306846 | 10/2002 |
| JP | 2004-110513 | 4/2004 |
| JP | 2006-338328 | 12/2006 |
| WO | WO-2005/073838 A2 | 8/2005 |
| WO | WO-2006/104132 A1 | 10/2006 |
| WO | WO 2007/070733 A2 | 6/2007 |
| WO | WO-2007/078639 A1 | 7/2007 |
| WO | WO 2007/097548 A1 | 8/2007 |
| WO | WO 2008/018943 A1 | 2/2008 |

OTHER PUBLICATIONS

European Search Report issued in European Patent Application No. 08252314.3, dated Dec. 17, 2012.

Vincent et al., "Detecting and matching feature points" *J. Vis. Commun. Image R.*, 16:38-54 (2005).

\* cited by examiner

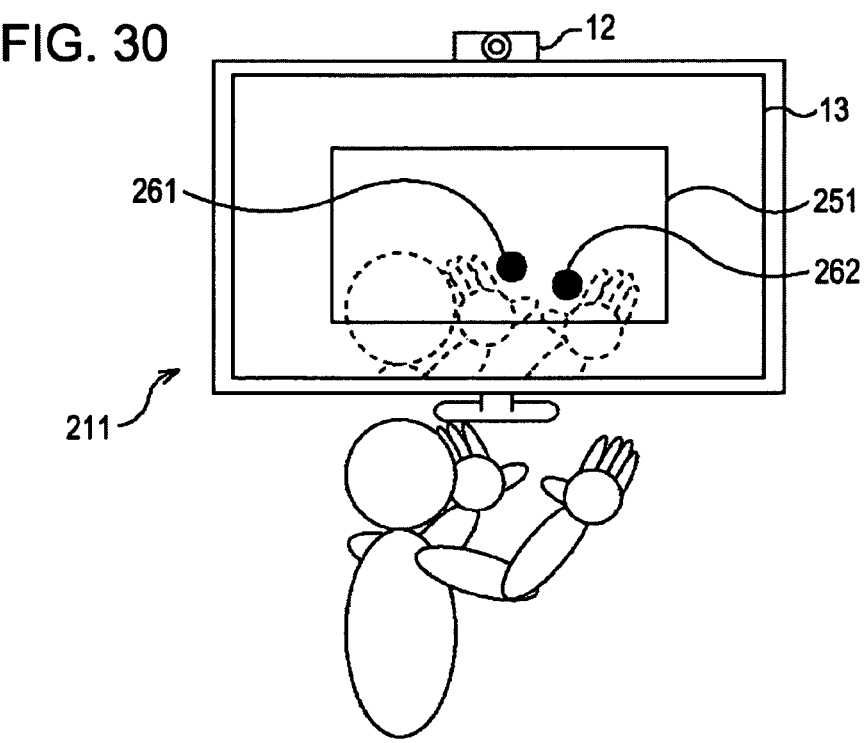
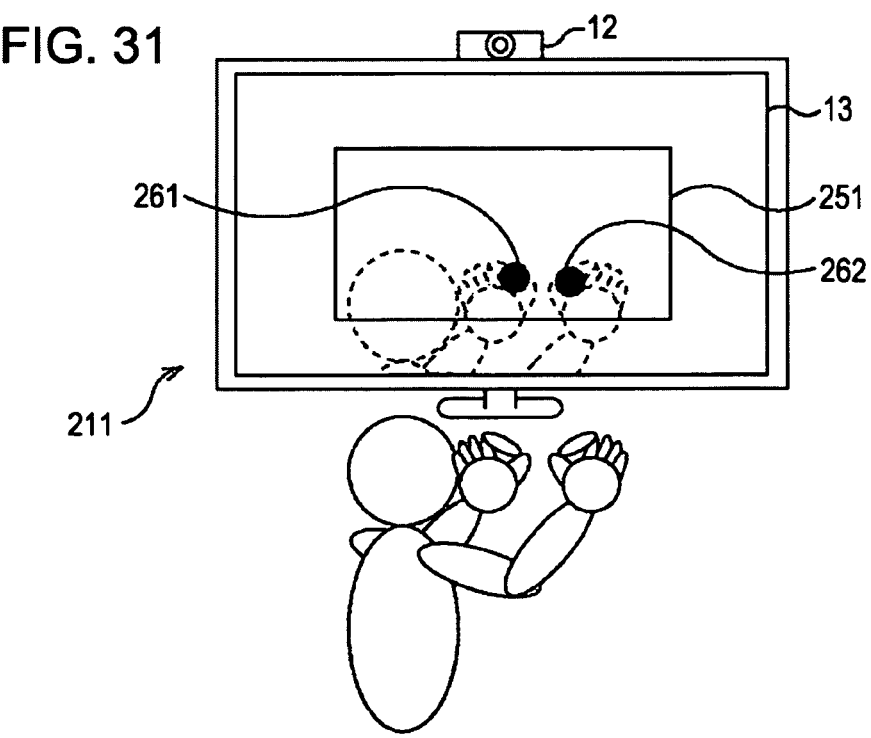

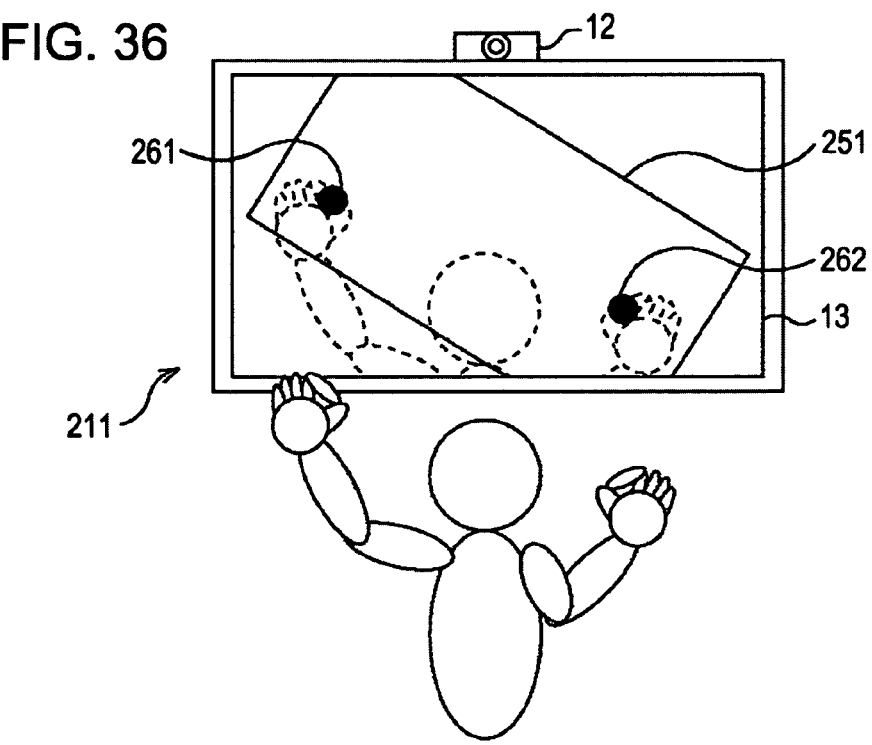
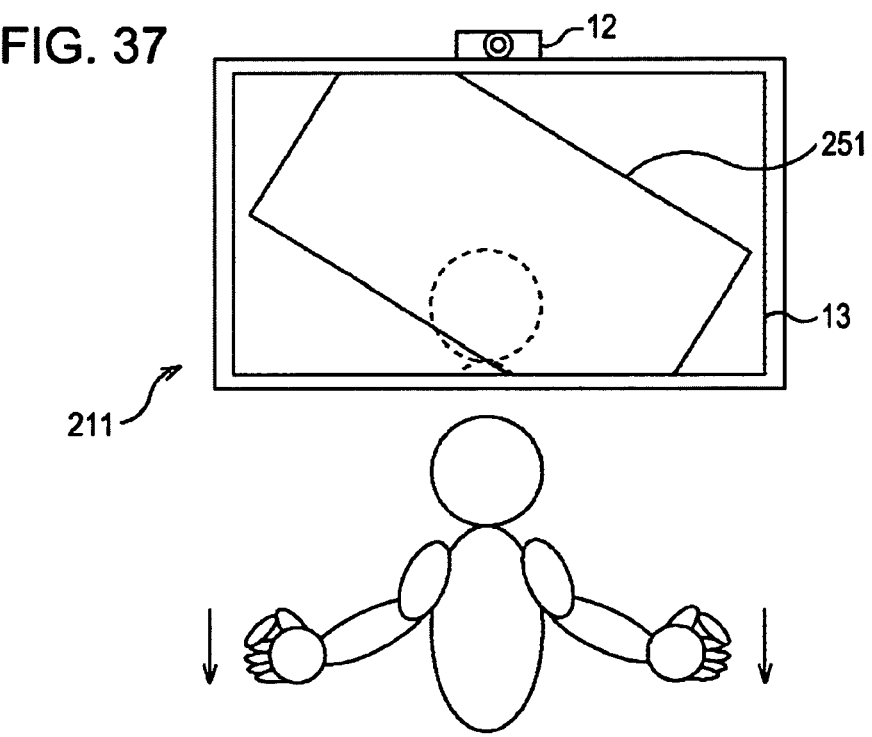

IMAGE PROCESSING APPARATUS AND METHOD, AND PROGRAM THEREFOR

CROSS REFERENCES TO RELATED APPLICATIONS

The present invention contains subject matter related to Japanese Patent Application JP 2007-241679 filed in the Japanese Patent Office on Sep. 19, 2007, the entire contents of which are incorporated herein by reference.

BACKGROUND OF THE INVENTION

1. Field of the Invention

The present invention relates to an image processing apparatus and method, and a program. More specifically, the present invention relates to an image processing apparatus and method that allow high recognition robustness and high-accuracy position detection of a pointing device with a minimum amount of processing, and to a program therefor.

2. Description of the Related Art

Recently, a plurality of interfaces used in cameras to recognize a gesture of a user's hand, which is used as a pointing device, and to provide device control based on the recognition result have been proposed.

For example, Japanese Unexamined Patent Application Publication No. 8-44490 discloses an interface configured to extract a portion corresponding to a user's hand from a captured image input from a charge coupled device (CCD) camera and to perform control based on the shape or position of the hand.

SUMMARY OF THE INVENTION

In a case where a portion corresponding to a user's hand is extracted from a captured image, for example, contours of all objects in the captured image are extracted and the portion corresponding to the hand is selected according to the shape of the contours using a technique such as matching, resulting in a large amount of processing and relatively long processing time. Further, due to the presence of a variety of hand shapes, the robustness of hand recognition is low and the accuracy of hand position detection is also low in the case of hand recognition based on the contour shape.

It is therefore desirable to provide high recognition robustness and high-accuracy position detection of a pointing device with a minimum amount of processing.

According to an embodiment of the present invention, an image processing apparatus includes the following elements. Extracting means extracts a feature point from a captured image. Recognizing means recognizes a position of the feature point. Display control means performs control, based on the position of the feature point, to display a feature-point pointer indicating the feature point. Issuing means issues, based on the position of the feature point, a command corresponding to the position of the feature point or a motion of the feature point.

In the image processing apparatus according to the embodiment of the present invention, the display control means may perform control, based on the position of the feature point, to display the feature-point pointer and predetermined user interfaces, and the issuing means may issue, based on the position of the feature point, a command corresponding to one of the user interfaces that is being displayed at the position of the feature point.

In the image processing apparatus according to the embodiment of the present invention, the extracting means may extract a plurality of feature points from the captured image, and the issuing means may issue, for each of the feature points, based on a position of the feature point, a command corresponding to the position of the feature point or a motion of the feature point.

In the image processing apparatus according to the embodiment of the present invention, the display control means may perform control, for each of the feature points, based on a position of the feature point, to display a feature-point pointer indicating the feature point and predetermined user interfaces, and the issuing means may issue, for each of the feature points, based on a position of the feature point, a command corresponding to one of the user interfaces that is being displayed at the position of the feature point.

In the image processing apparatus according to the embodiment of the present invention, the display control means may perform control, for each of the feature points, based on a position of the feature point, to display a feature-point pointer indicating the feature point and to display predetermined user interfaces, the predetermined user interfaces being shared by the plurality of feature points, and the issuing means may issue, for each of the feature points, based on a position of the feature point, a command corresponding to one of the user interfaces that is being displayed at the position of the feature point.

In the image processing apparatus according to the embodiment of the present invention, the extracting means may extract a plurality of feature points from the captured image, and the issuing means may issue commands corresponding to positions or motions of the plurality of feature points.

According to another embodiment of the present invention, an image processing method for an image processing apparatus configured to extract a feature point from a captured image includes the steps of extracting the feature point from the captured image; recognizing a position of the feature point; displaying, based on the position of the feature point, a feature-point pointer indicating the feature point; and issuing, based on the position of the feature point, a command corresponding the position of the feature point or a motion of the feature point.

According to another embodiment of the present invention, a program causes a computer to execute image processing for extracting a feature point from a captured image, the image processing including the steps of extracting the feature point from the captured image; recognizing a position of the feature point; displaying, based on the position of the feature point, a feature-point pointer indicating the feature point; and issuing, based on the position of the feature point, a command corresponding the position of the feature point or a motion of the feature point.

According to an embodiment of the present invention, a feature point is extracted from a captured image, a position of the feature point is recognized, a feature-point pointer indicating the feature point is displayed based on the position of the feature point, and a command corresponding to the position of the feature point or a motion of the feature point is issued based on the position of the feature point.

According to an embodiment of the present invention, therefore, high recognition robustness and high-accuracy position detection of a pointing device are achieved with a minimum amount of processing.

BRIEF DESCRIPTION OF THE DRAWINGS

FIG. 30 is a diagram showing the example of the use of the pointing devices in the image processing apparatus shown in FIG. 27;

FIG. 31 is a diagram showing the example of the use of the pointing devices in the image processing apparatus shown in FIG. 27;

FIG. 36 is a diagram showing the example of the use of the pointing devices in the image processing apparatus shown in FIG. 27;

FIG. 37 is a diagram showing the example of the use of the pointing devices in the image processing apparatus shown in FIG. 27;

DESCRIPTION OF THE PREFERRED EMBODIMENTS

Figure 1:
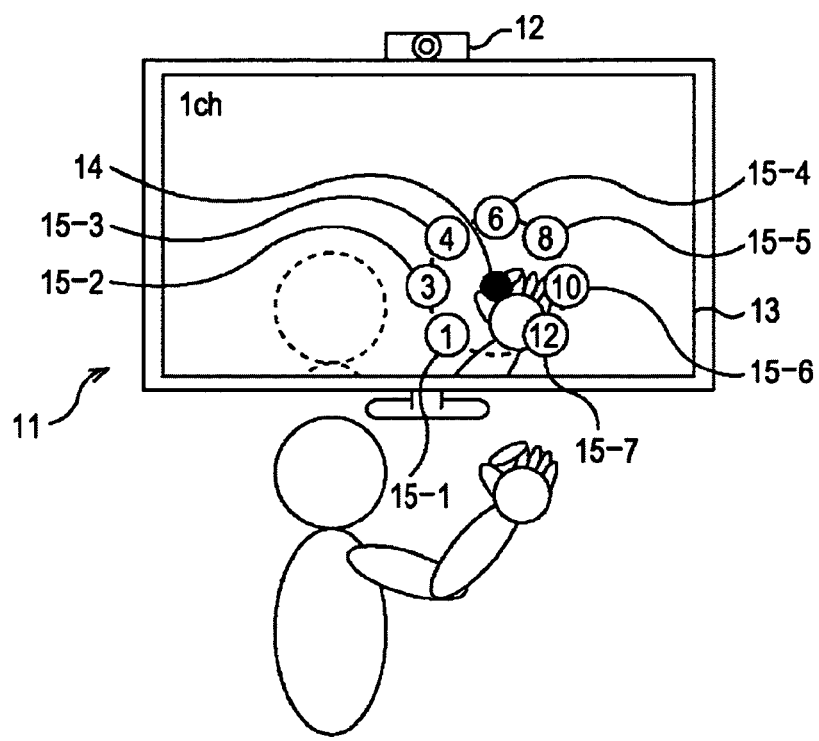
FIG. 1 is a diagram showing an overview of an image processing apparatus according to a first embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, an image processing apparatus (e.g., an image processing apparatus 11 shown in FIG. 2) includes extracting means (e.g., a feature point extraction unit 34 shown in FIG. 2) for extracting a feature point from a captured image; recognizing means (e.g., a calculation unit 35 shown in FIG. 2) for recognizing a position of the feature point; display control means (e.g., a combining unit 39 shown in FIG. 2) for performing control, based on the position of the feature point, to display a feature-point pointer indicating the feature point; and issuing means (e.g., a command issuing unit 38 shown in FIG. 2) for issuing, based on the position of the feature point, a command corresponding to the position of the feature point or a motion of the feature point.

According to another embodiment of the present invention, an image processing method for an image processing apparatus (e.g., an image processing apparatus 11 shown in FIG. 2) configured to extract a feature point from a captured image includes the steps of extracting (e.g., step S13 shown in FIG. 21) the feature point from the captured image; recognizing (e.g., step S17 shown in FIG. 21) a position of the feature point; displaying (e.g., step S15 shown in FIG. 21), based on the position of the feature point, a feature-point pointer indicating the feature point; and issuing (e.g., step S19 shown in FIG. 21), based on the position of the feature point, a command corresponding the position of the feature point or a motion of the feature point.

A specific embodiment of the present invention will be described in detail with reference to the drawings.

FIG. 1 shows an overview of an image processing apparatus according to a first embodiment of the present invention.

Referring to FIG. 1, an image processing apparatus 11 includes a camera 12 configured to capture an image of a user. The image processing apparatus 11 analyzes the captured image of the user, and displays an image obtained from the analysis on a display unit 13, such as a display monitor, provided on the image processing apparatus 11.

In the example shown in FIG. 1, the user is watching a television program on channel 1 (1ch). In this example, the user first waves their hand to the camera 12 to change the channel of the television program to be viewed.

Then, in the image processing apparatus 11, as shown in FIG. 1, a feature-point pointer 14 indicating a feature point of the captured image and user interfaces (UIs) 15-1 to 15-7 to be operated to select each channel are displayed over an image of the television program of channel 1 on the display unit 13. On the display unit 13, a mirrored or horizontally flipped image of the captured image is also displayed in a translucent manner. The UIs 15-1 to 15-7 are arranged along a circumference of a predetermined circle surrounding the original feature-point pointer 14. The UIs 15-1 to 15-7 are assigned the numbers of channels to be selectable.

Then, the user performs an action of enclosing a volume of space in the real world, which corresponds to the feature-point pointer 14, with their fingers from the left and right sides, while viewing the captured image currently being displayed in a translucent manner on the display unit 13, so that the hand of the user can close around the volume of space. In the following description, this action is referred to as "grabbing". The user moves the hand grabbing the feature-point pointer 14 so that the feature-point pointer 14 can be superimposed on one of the UIs 15-1 to 15-7 that is assigned the number of the channel of the television program desired to be viewed.

The image processing apparatus 11 detects the position of the feature point indicated by the feature-point pointer 14 grabbed by the user from the image captured using the camera 12, and a command corresponding to one of the UIs 15-1 to 15-7 that is located at the position of the feature point is issued.

For example, in FIG. 1, the user moves their hand grabbing the feature-point pointer 14 with the fingers so that the feature-point pointer 14 can be superimposed on the UI 15-4 displayed on the display unit 13, which is assigned channel "6". Then, a command for displaying an image of a television program of channel 6 is issued. As a result, the user can view the television program of channel 6.

In the following description, the UIs 15-1 to 15-7 are collectively referred to as "UIs 15" unless otherwise individually identified.

Figure 2:
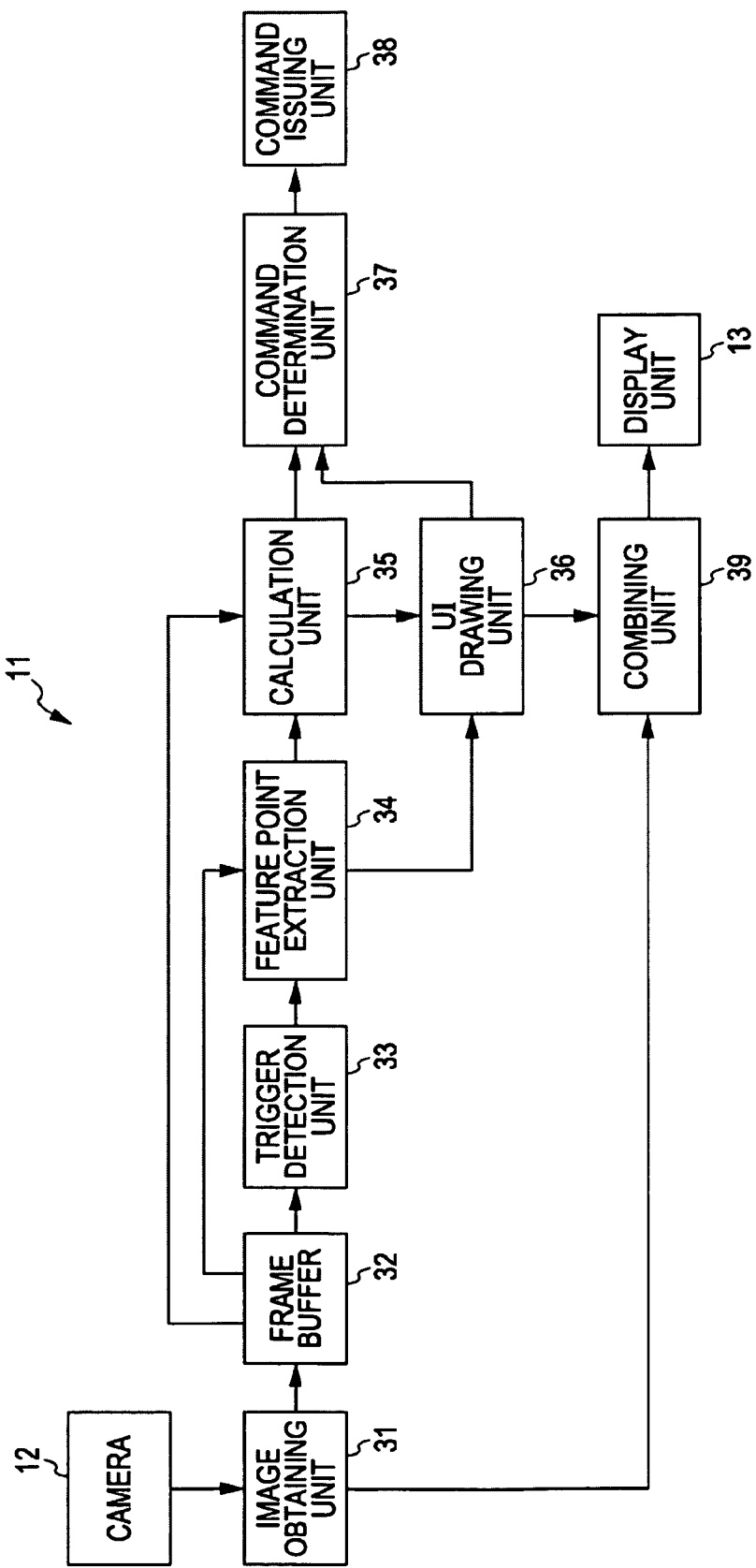
FIG. 2 is a block diagram showing an example structure of the image processing apparatus shown in FIG. 1.

FIG. 2 is a block diagram showing an example structure of the image processing apparatus 11 shown in FIG. 1.

The image processing apparatus 11 shown in FIG. 2 includes the camera 12, the display unit 13, an image obtaining unit 31, a frame buffer 32, a trigger detection unit 33, a feature point extraction unit 34, a calculation unit 35, a UI drawing unit 36, a command determination unit 37, a command issuing unit 38, and a combining unit 39.

The camera 12 may be a video camera including a photoelectric conversion element configured to convert an optical image into an electrical signal, such as a CCD sensor or a complementary metal-oxide semiconductor (CMOS) sensor, and is configured to capture an image of a user. The camera 12 supplies the captured image frame-by-frame to the image obtaining unit 31.

The image obtaining unit 31 supplies the captured image supplied from the camera 12 to the frame buffer 32 and the combining unit 39. The frame buffer 32 stores the captured image, which is supplied from the image obtaining unit 31, frame-by-frame for a period of time corresponding to a predetermined number of frames.

The trigger detection unit 33 reads the captured image from the frame buffer 32. The trigger detection unit 33 detects, based on the captured image, a trigger indicating that the user has waved their hand to the camera 12. The trigger may be detected using a method such as a method of analyzing frequency components in the time domain or a method of analyzing a motion of a moving area using interframe difference. The trigger detection unit 33 supplies area information indicating an area where the waving of the hand of the user has been detected within the captured image to the feature point extraction unit 34.

The feature point extraction unit 34 reads the captured image from the frame buffer 32. The feature point extraction unit 34 extracts one corner point as a feature point using the luminance component in the area of the captured image designated by the area information supplied from the trigger detection unit 33. The term "corner point" means a point with a large luminance gradient both in the X direction (horizontal direction) and in the Y direction (vertical direction).

Examples of the corner point include a Harris corner point and a corner point extracted using the SUSAN operator. A technique for extracting a corner point using the SUSAN operator is described in, for example, the paper entitled "Detection of an Image Feature Point using the SUSAN Operator", which is available from home page at http://www.oita-ri.go.jp/report/2002/2002_12.pdf.

Accordingly, since the feature point extraction unit 34 extracts a feature point using the luminance component of a captured image, the robustness of feature point extraction under lighting environment conditions is high.

The feature point extraction unit 34 supplies extracted-position information indicating the position of the extracted feature point to the calculation unit 35 and the UI drawing unit 36.

The calculation unit 35 reads two consecutive frames of the captured image from the frame buffer 32. The calculation unit 35 calculates, for each frame, the optical flow of the feature point on the basis of the read two frames of the captured image and the extracted-position information supplied from the feature point extraction unit 34 or feature point information indicating the current position of the feature point.

The optical flow may be calculated using, for example, a block matching method or a gradient method. Since, as described above, a corner point is a point with a large luminance gradient both in the X direction and in the Y direction, the calculation accuracy of optical flow is high.

The calculation unit 35 further recognizes, based on the optical flow, the current position of the feature point, and updates the feature point information. The calculation unit 35 supplies the feature point information to the UI drawing unit 36 and the command determination unit 37.

The UI drawing unit 36 stores a feature-point pointer image and UI images in advance. The UI drawing unit 36 determines, based on the extracted-position information supplied from the feature point extraction unit 34, an arrangement of UIs so that the UIs can be arranged around a feature point. The. UI drawing unit 36 supplies UI information indicating the arrangement of UIs and the UI images stored therein in advance to the combining unit 39. The UI drawing unit 36 also supplies the extracted-position information or the feature point information supplied from the calculation unit 35, and the feature-point pointer image stored therein in advance to the combining unit 39. The UI drawing unit 36 further supplies the UI information to the command determination unit 37.

The command determination unit 37 detects, based on the feature point information supplied from the calculation unit 35 and the UI information supplied from the UI drawing unit 36, a UI currently being displayed at the position of the feature point. The command determination unit 37 supplies an event indicating that the UI has been operated and identification information for identifying the UI to the command issuing unit 38.

The command determination unit 37 stores in advance a table in which motions of a feature point and events or commands are associated with each other. The command determination unit 37 recognizes, based on the feature point information supplied from the calculation unit 35, a locus of the position of the feature point, and reads an event or command associated with the motion indicated by the locus from the table stored therein in advance. The command determination unit 37 supplies the read event or command to the command issuing unit 38.

The command issuing unit 38 stores in advance a table in which identification information and a command corresponding to a UI identified by the identification information are associated with each other. The command issuing unit 38 reads, based on the event and identification information supplied from the command determination unit 37, the command associated with the UI identified by the identification information from the table stored therein in advance, and issues the command. The command issuing unit 38 further issues the event or command supplied from the command determination unit 37 as a command.

The combining unit 39 obtains an image of content desired to be viewed from an external apparatus (not shown) such as an apparatus connected through a tuner or via a network. The combining unit 39 supplies the desired image to the display unit 13 so that the desired image is directly displayed as an image of a screen on which the desired image is displayed (hereinafter referred to as an "image-viewing screen").

The combining unit 39 further combines, based on the UI information, UI images, extracted-position information or feature point information, and feature-point pointer image supplied from the UI drawing unit 36, the UI images and the feature-point pointer image with the image of the image-viewing screen, and supplies the combined image to the display unit 13 for display.

Further, the combining unit 39 produces a mirrored image of the captured image supplied from the image obtaining unit 31. The combining unit 39 further combines the mirrored image of the captured image with the combined image of the image-viewing screen so that the mirrored image of the captured image can be displayed in a translucent manner on the image-viewing screen on which the UI images and the feature-point pointer image are combined. The combining unit 39 supplies the resulting combined image to the display unit 13 for display.

The action of grabbing the feature-point pointer 14 will now be described with reference to FIG. 3.

Figure 3:
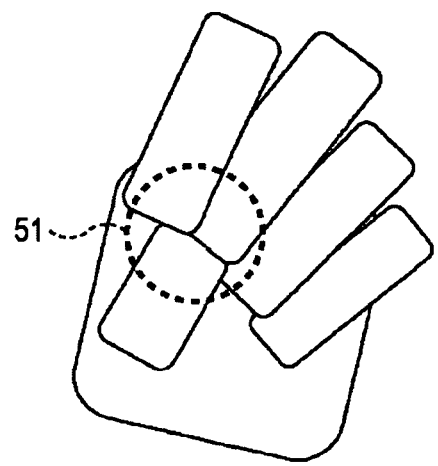
FIG. 3 is a diagram showing an action of grabbing a feature-point pointer.

In FIG. 3, a volume of space 51 is a volume of space whose location corresponds to the position of the feature-point pointer 14 displayed on the display unit 13 shown in FIG. 1. As shown in FIG. 3, when the user grabs the feature-point pointer 14 with their hand by enclosing the volume of space 51 with the fingers from the left and right sides so that the hand can close around the volume of space 51, the feature point is located in an image of the hand grabbing the feature-point pointer 14.

As the user moves the hand grabbing the feature-point pointer 14, an optical flow indicating the motion of the hand is calculated as the optical flow of the feature point. As a result, the user can use the hand grabbing the feature-point pointer 14 as a pointing device.

Accordingly, the image processing apparatus 11 is configured to, instead of recognizing a user's hand based on the shape thereof or the like to detect a motion of the hand, recognize a feature point that is indicated by the feature-point pointer 14 grabbed with a user's hand and that moves along with the user's hand, and to detect a motion of the feature point as a motion of the user's hand. Therefore, the recognition robustness and precision of position detection of a pointing device can be improved with a minimum amount of processing compared with the case of recognizing a user's hand based on the shape thereof or the like to detect a motion of the hand.

In the image processing apparatus 11, furthermore, once a user grabs the feature-point pointer 14 with their hand, a motion of the hand can be detected. Assuming that a detection method in which once a user moves their hand, a motion of the hand is detected is referred to as a fully automatic hand gesture detection method, the detection method employed by the image processing apparatus 11 may be referred to as a semi-automatic hand gesture detection method.

The use of a pointing device in the image processing apparatus 11 will now be described with reference to FIGS. 4 to 11.

Figure 4:
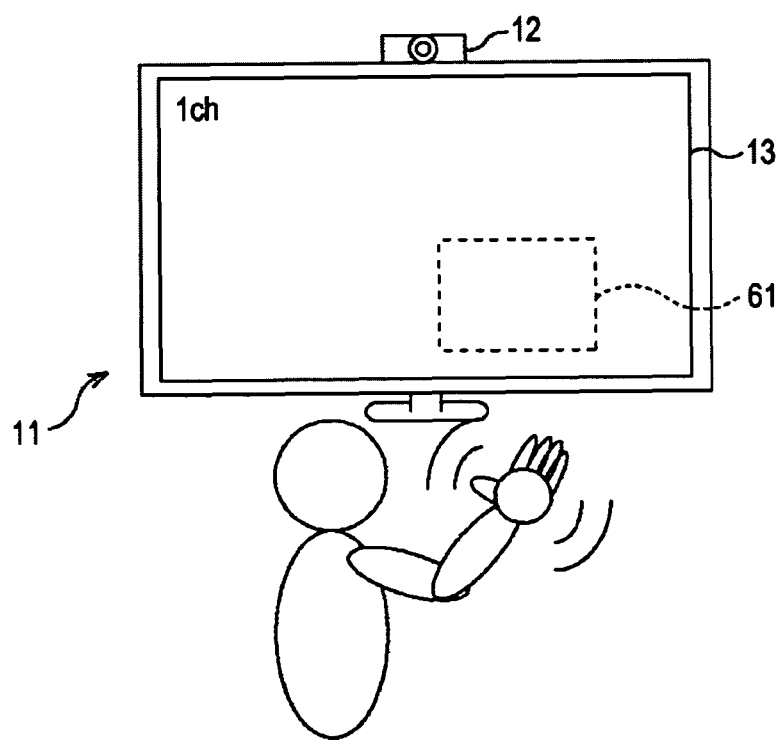
FIG. 4 is a diagram showing an example of the use of a pointing device in the image processing apparatus shown in FIG. 2.

As shown in FIG. 4, first, a user waves their hand to the camera 12 during the watching of, for example, a television program on channel 1. In the image processing apparatus 11, the waving of the hand of the user is detected as a trigger within an area 61, and a feature point is extracted in the area 61.

Figure 5:
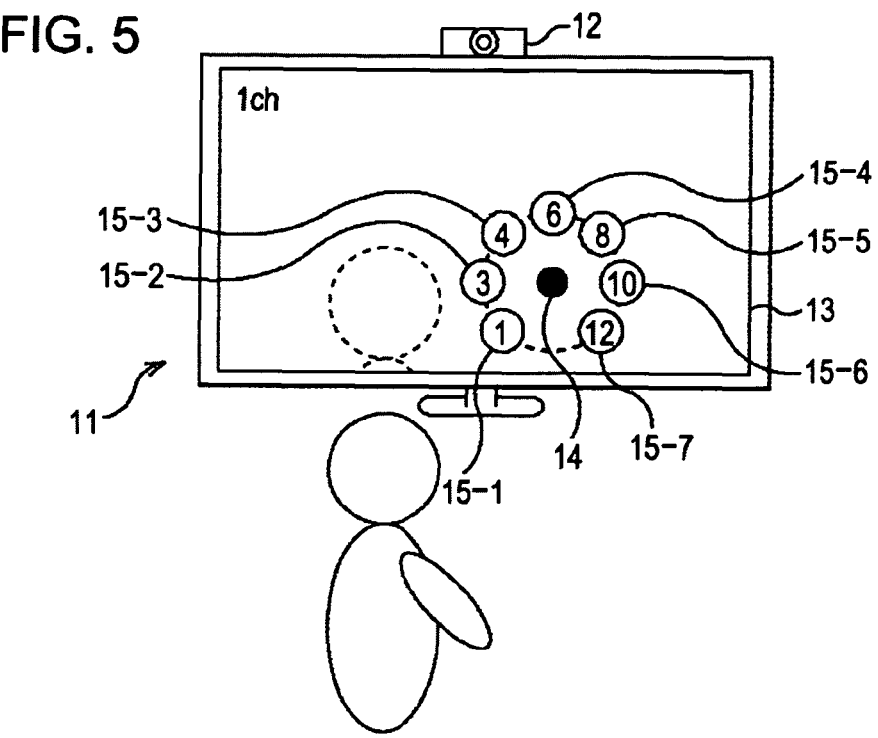
FIG. 5 is a diagram showing the example of the use of the pointing device in the image processing apparatus shown in FIG. 2.

Then, as shown in FIG. 5, on the display unit 13, a mirrored image of a captured image is displayed in a translucent manner on an image-viewing screen on which an image of the television program of channel 1 is being currently displayed, and the feature-point pointer 14 and the UIs 15 are displayed on the basis of the feature point. Thus, the user can simultaneously view the image of the television program of channel 1, which is a target to be viewed, the image of the user who is facing the camera 12, the feature-point pointer 14, and the UIs 15.

Figure 6:
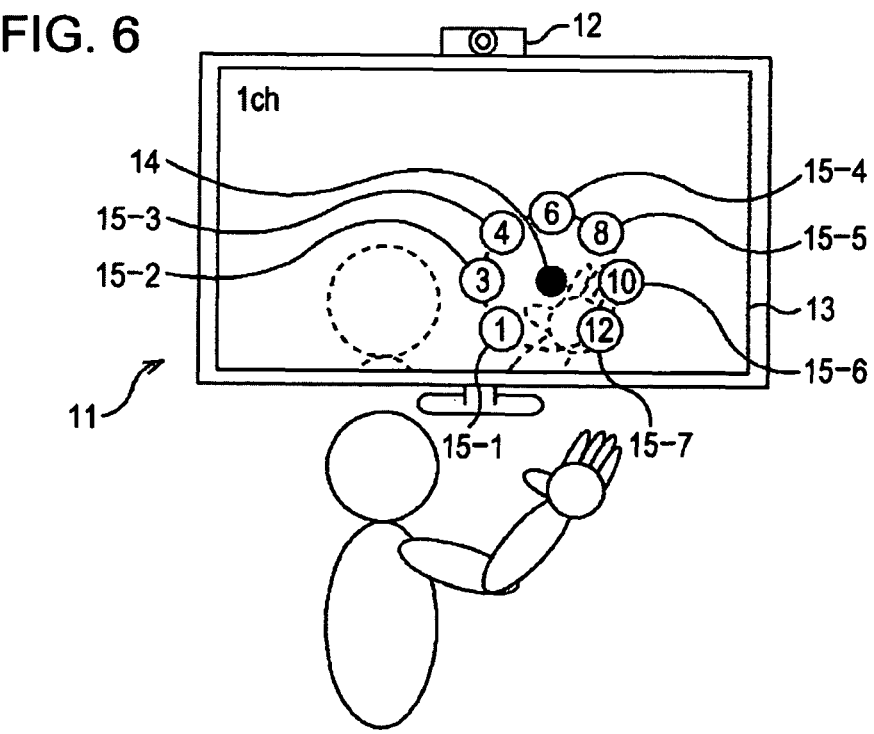
FIG. 6 is a diagram showing the example of the use of the pointing device in the image processing apparatus shown in FIG. 2.
Figure 7:
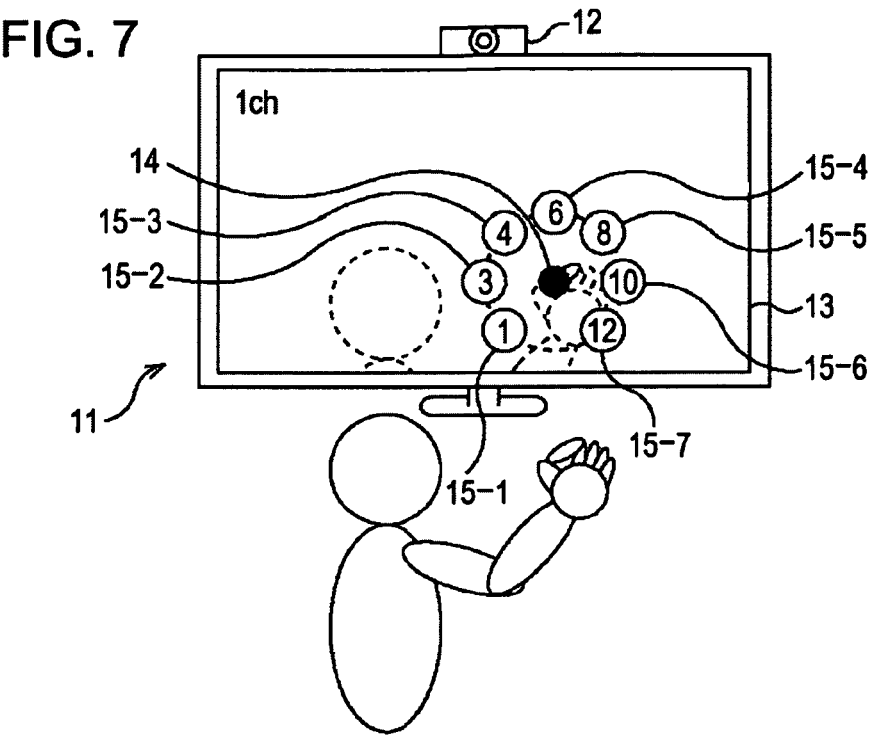
FIG. 7 is a diagram showing the example of the use of the pointing device in the image processing apparatus shown in FIG. 2.

Then, as shown in FIG. 6, the user encloses a volume of space corresponding to the feature-point pointer 14 with the fingers of their right hand from the left and right sides, while viewing the feature-point pointer 14 being currently displayed on the display unit 13, so that the right hand of the user can close around the volume of space in a manner shown in FIG. 7. That is, the user grabs the feature-point pointer 14.

Figure 8:
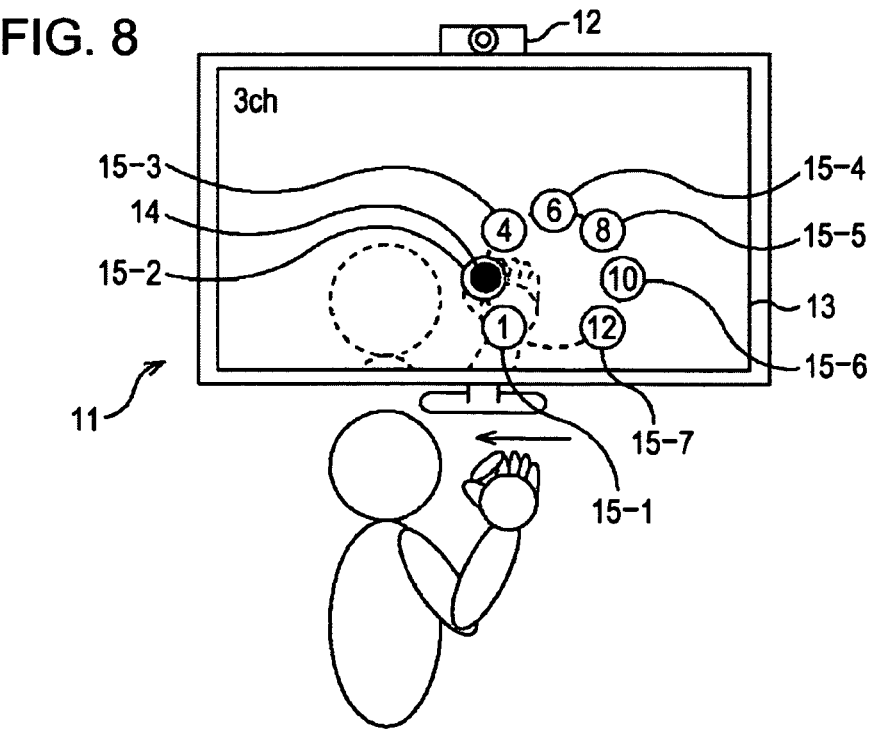
FIG. 8 is a diagram showing the example of the use of the pointing device in the image processing apparatus shown in FIG. 2.

Then, for example, the user moves their right hand grabbing the feature-point pointer 14 to the left with respect to the camera 12 in a manner shown in FIG. 8, while viewing the feature-point pointer 14 and UIs 15 being currently displayed on the display unit 13, so that the feature-point pointer 14 can be superimposed on the UI 15-2 on the image-viewing screen of the display unit 13.

Thus, a command for setting a television program of channel 3 as a target to be viewed is issued as the command associated with the UI 15-2. As a result, as shown in FIG. 8, an image of the target to be displayed on the display unit 13 is changed from the image of the television program of channel 1 to an image of the television program of channel 3.

Figure 9:
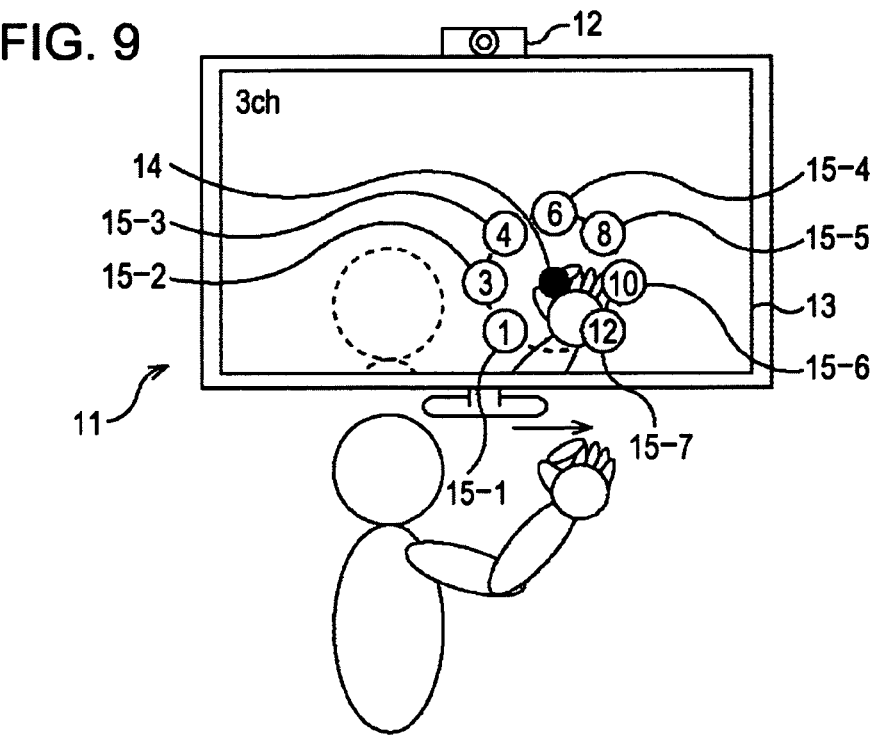
FIG. 9 is a diagram showing the example of the use of the pointing device in the image processing apparatus shown in FIG. 2.
Figure 10:
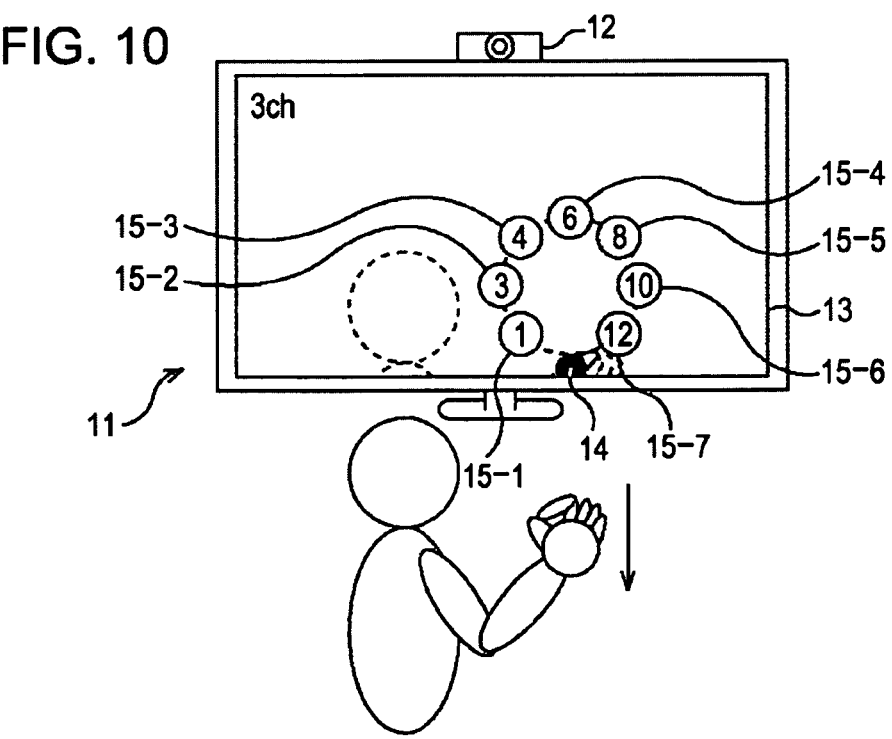
FIG. 10 is a diagram showing the example of the use of the pointing device in the image processing apparatus shown in FIG. 2.

Then, as shown in FIG. 9, the user moves their right hand grabbing the feature-point pointer 14 to the right with respect to the camera 12. Then, as shown in FIG. 10, the user moves their right hand grabbing the feature-point pointer 14 downward with respect to the camera 12 so as to move the feature-point pointer 14 outside the circle defined by the UIs 15. Thus, a command for terminating the interface display process is issued.

Figure 11:
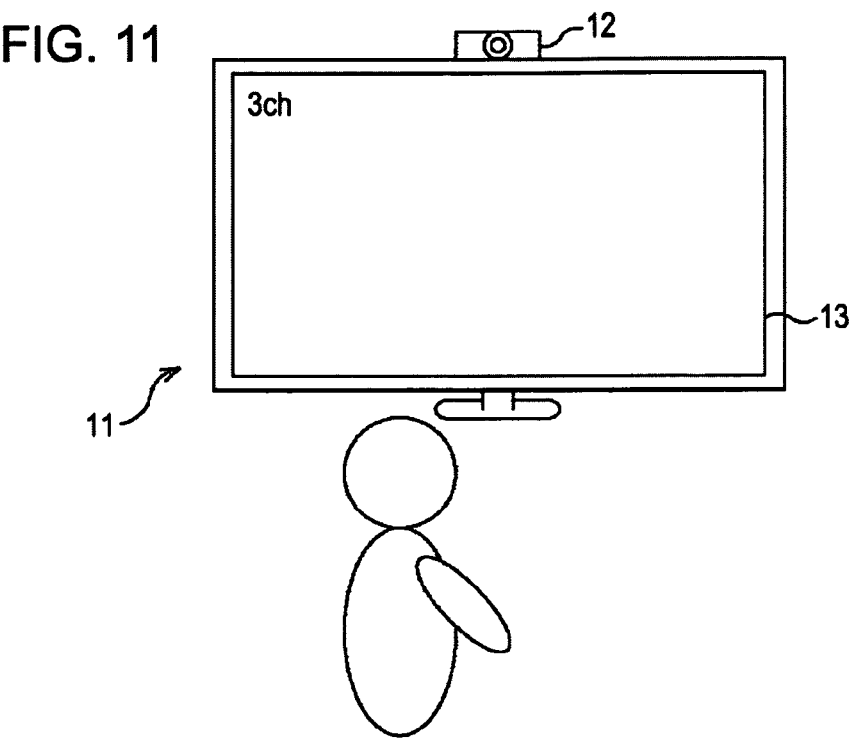
FIG. 11 is a diagram showing the example of the use of the pointing device in the image processing apparatus shown in FIG. 2.

As a result, as shown in FIG. 11, the captured image, the feature-point pointer 14, and the UIs 15 are deleted from the display unit 13. That is, only the image of the target, i.e., the television program of channel 3, is displayed on the image-viewing screen of the display unit 13.

When the user further desires to change a channel of a television program to be viewed instead of terminating the interface display process, as shown in FIG. 9, the user moves their right hand grabbing the feature-point pointer 14 to the right with respect to the camera 12 to return the feature-point pointer 14 to the inside of the circle defined by the UIs 15, and then moves their right hand grabbing the feature-point pointer 14 so that the feature-point pointer 14 can be superimposed on one of the UIs 15 that is assigned a desired channel number. As a result, an image of a television program of the channel desired by the user is displayed on the display unit 13, and the captured image, the feature-point pointer 14, and the UIs 15 are displayed on this image.

In FIGS. 4 to 11, the target to be viewed is a television program by way of example, and the use of a pointing device to change a channel of a television program to be viewed has been described. However, the target to be viewed is not limited to a television program.

Figure 12:
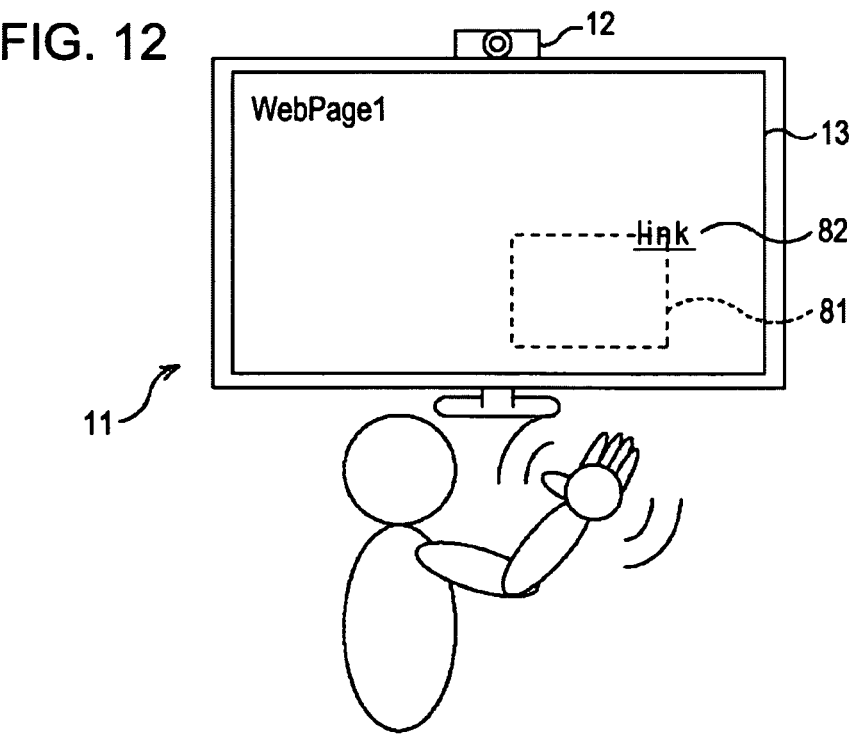
FIG. 12 is a diagram showing a second example of the use of a pointing device in the image processing apparatus shown in FIG. 2.

For example, as shown in FIGS. 12 to 20, the target to be viewed may be a Web page. In this case, as shown in FIG. 12, first, the user waves their hand to the camera 12 during the viewing of, for example, a Web page (WebPage1) having a link 82. In the image processing apparatus 11, the waving of the hand of the user is detected as a trigger within an area 81, and a feature point is extracted in the area 81.

Figure 13:
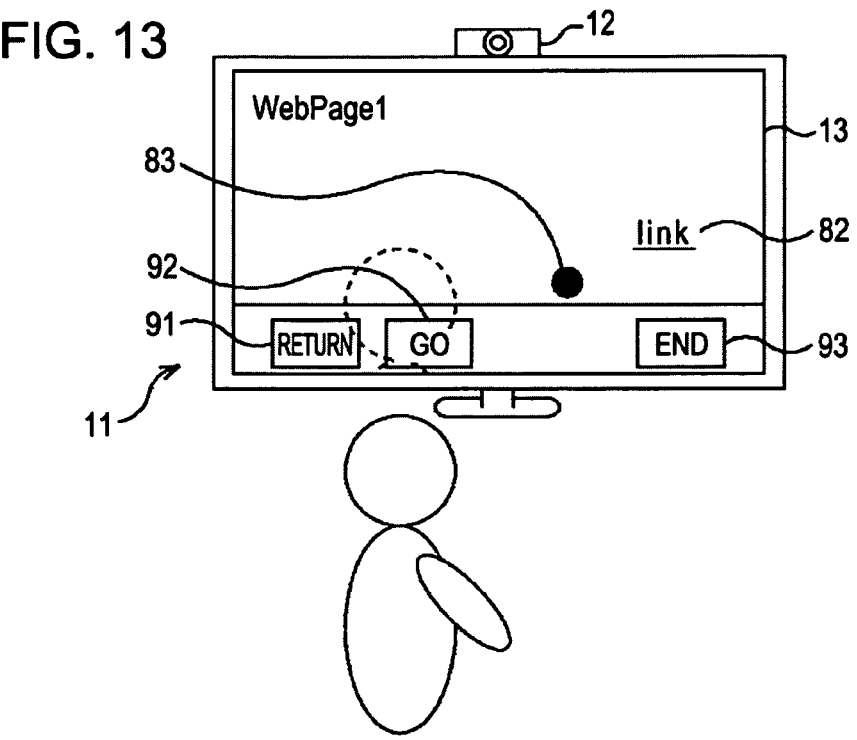
FIG. 13 is a diagram showing the second example of the use of the pointing device in the image processing apparatus shown in FIG. 2.

Then, as shown in FIG. 13, on the display unit 13, a mirrored image of a captured image is displayed in a translucent manner on the Web page having the link 82, and a feature-point pointer 83 and UIs 91 to 93 are displayed on the basis of the feature point. The UI 91 is operated to view the previous Web page, and the UI 92 is operated to view the next Web page. The UI 93 is operated to terminate the interface display process.

Figure 14:
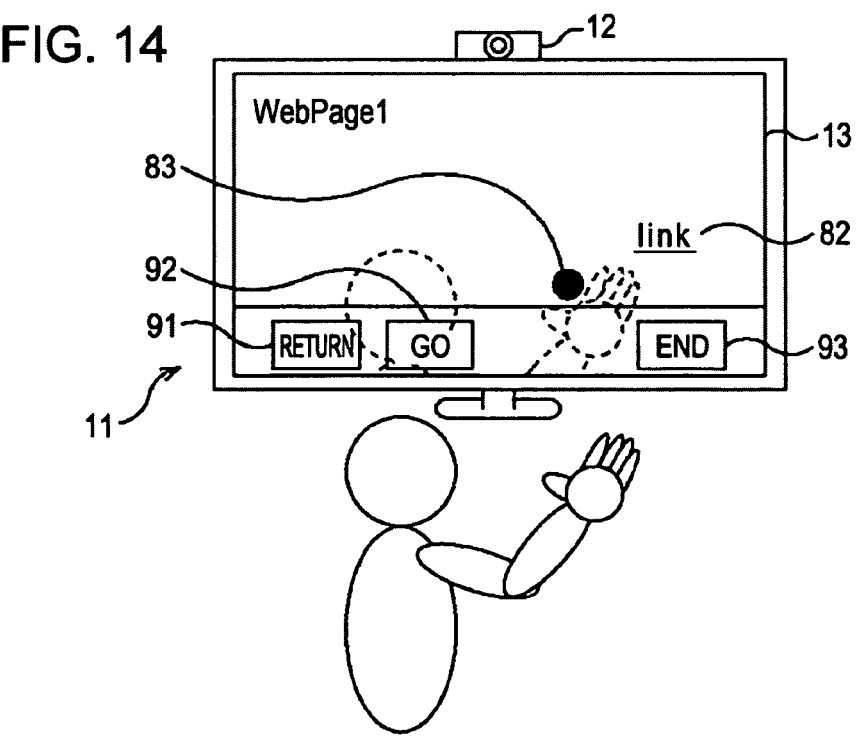
FIG. 14 is a diagram showing the second example of the use of the pointing device in the image processing apparatus shown in FIG. 2.
Figure 15:
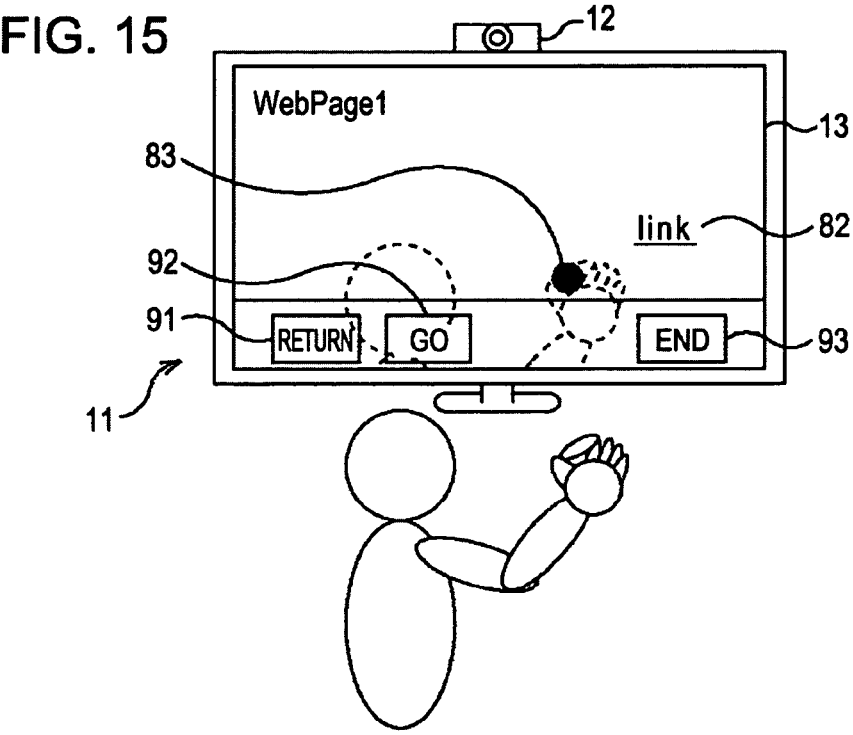
FIG. 15 is a diagram showing the second example of the use of the pointing device in the image processing apparatus shown in FIG. 2.

Then, as shown in FIG. 14, the user encloses a volume of space corresponding to the feature-point pointer 83 with the fingers of their right hand from the left and right sides, while viewing the feature-point pointer 83 being currently displayed on the display unit 13, so that the right hand of the user can close around the volume of space in a manner shown in FIG. 15. That is, the user grabs the feature-point pointer 83.

Figure 16:
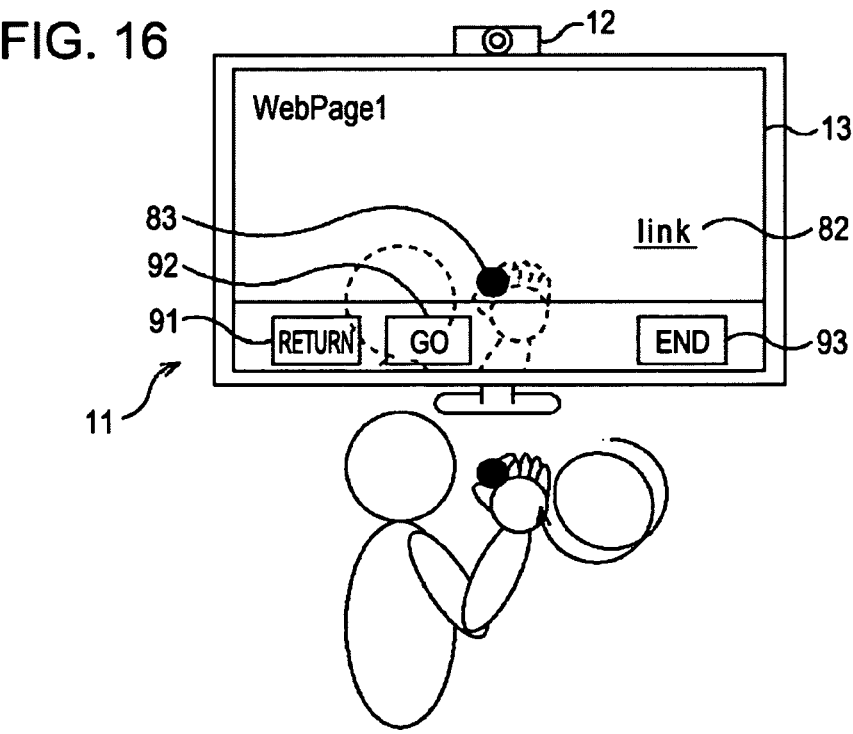
FIG. 16 is a diagram showing the second example of the use of the pointing device in the image processing apparatus shown in FIG. 2.

Then, as shown in FIG. 16, the user moves their right hand grabbing the feature-point pointer 83 in a circular manner two times in a clockwise direction with respect to the camera 12, and then stops for two seconds or more. This action (hereinafter referred to as a "two-circular-motions-and-stop action") corresponds to a click of a mouse. In response to a two-circular-motions-and-stop action, the image processing apparatus 11 issues a command for changing the color of the feature-point pointer 83.

Figure 17:
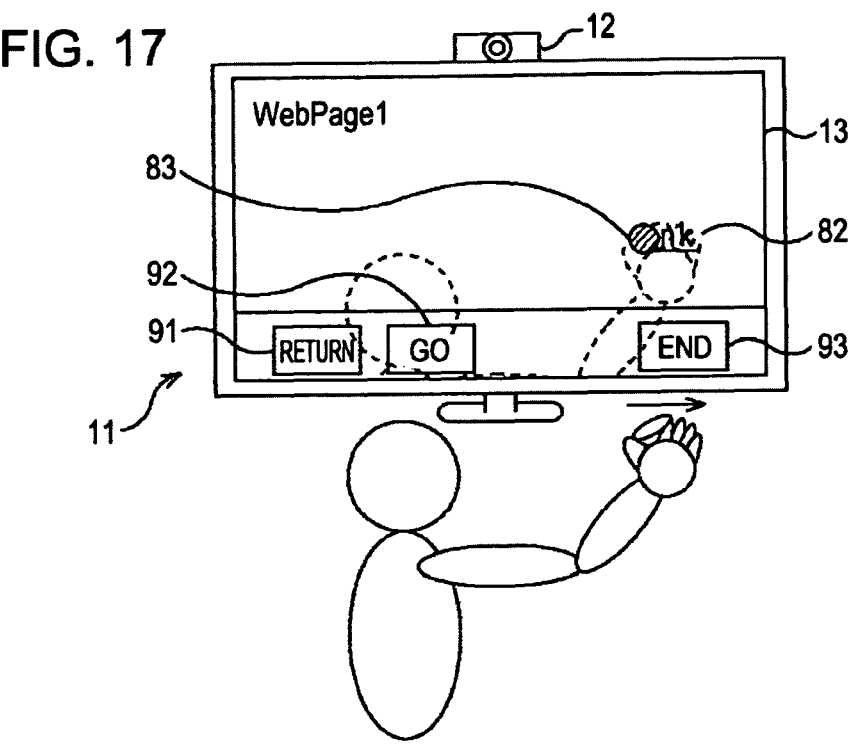
FIG. 17 is a diagram showing the second example of the use of the pointing device in the image processing apparatus shown in FIG. 2.

Then, for example, as shown in FIG. 17, the user moves their right hand grabbing the feature-point pointer 83 to the right with respect to the camera 12, while viewing the link 82, the feature-point pointer 83 whose color has been changed, and the UIs 91 to 93, which are currently being displayed on the display unit 13, so that the feature-point pointer 83 whose color has been changed can be superimposed on the link 82 on the image-viewing screen of the display unit 13, and then stops for several seconds.

Figure 18:
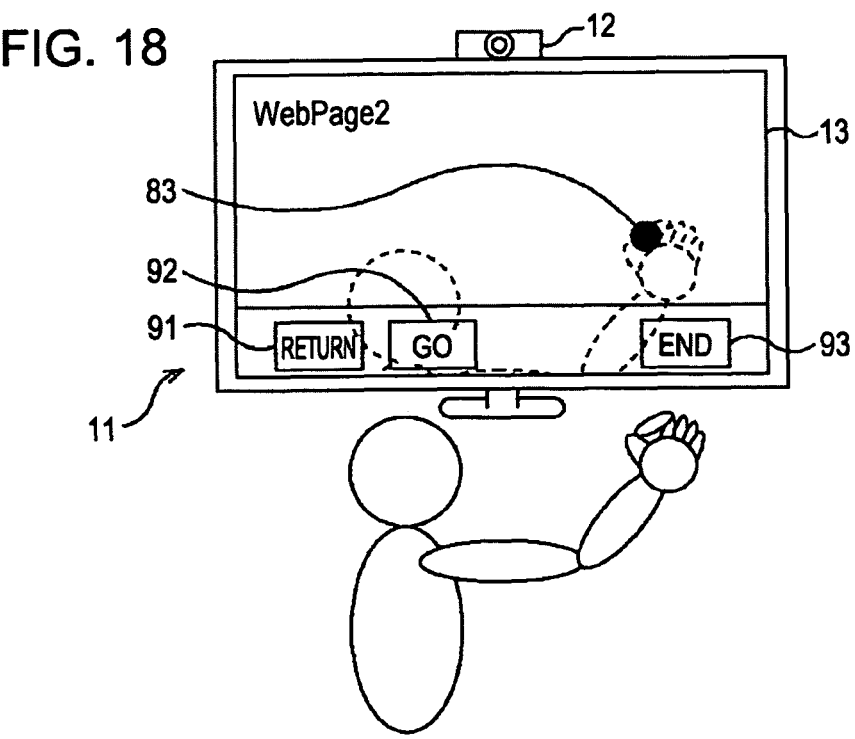
FIG. 18 is a diagram showing the second example of the use of the pointing device in the image processing apparatus shown in FIG. 2.

Thus, in the image processing apparatus 11, an event corresponding to a click of a mouse on the link 82 is issued as a command, and a command for returning the color of the feature-point pointer 83 to the original color is also issued. As a result, as shown in FIG. 18, an image of the target to be displayed on the display unit 13 is changed from the Web page (WebPage1) having the link 82 to a Web page (WebPage2) corresponding to the link 82, and the color of the feature-point pointer 83 is returned to the original color.

Figure 19:
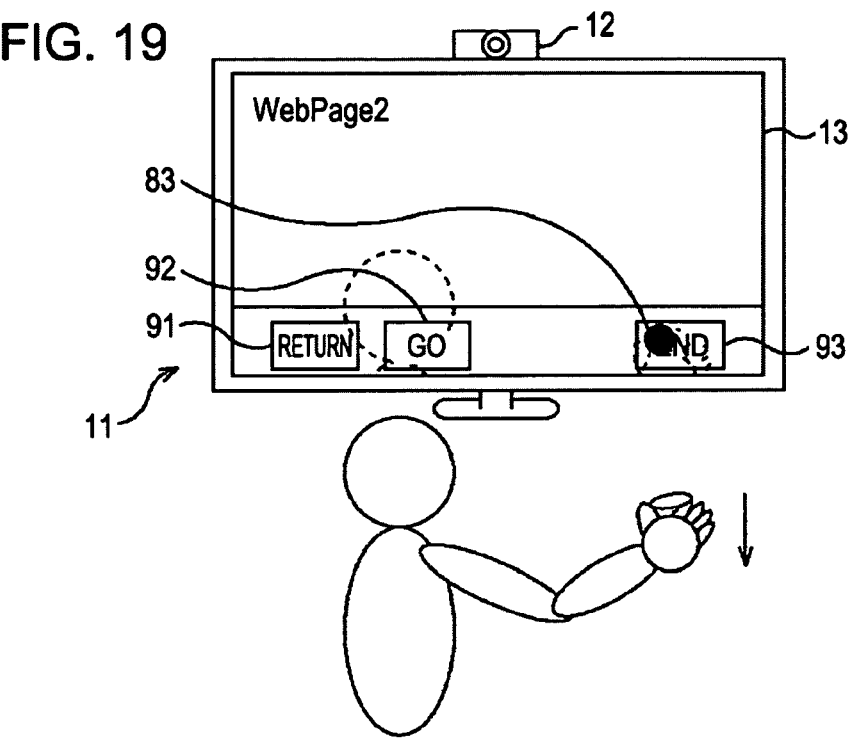
FIG. 19 is a diagram showing the second example of the use of the pointing device in the image processing apparatus shown in FIG. 2.

Then, as shown in FIG. 19, the user moves their right hand grabbing the feature-point pointer 83 downward with respect to the camera 12 so that the feature-point pointer 83 can be superimposed on the UI 93 on the image-viewing screen of the display unit 13. Thus, a command for terminating the interface display process is issued.

Figure 20:
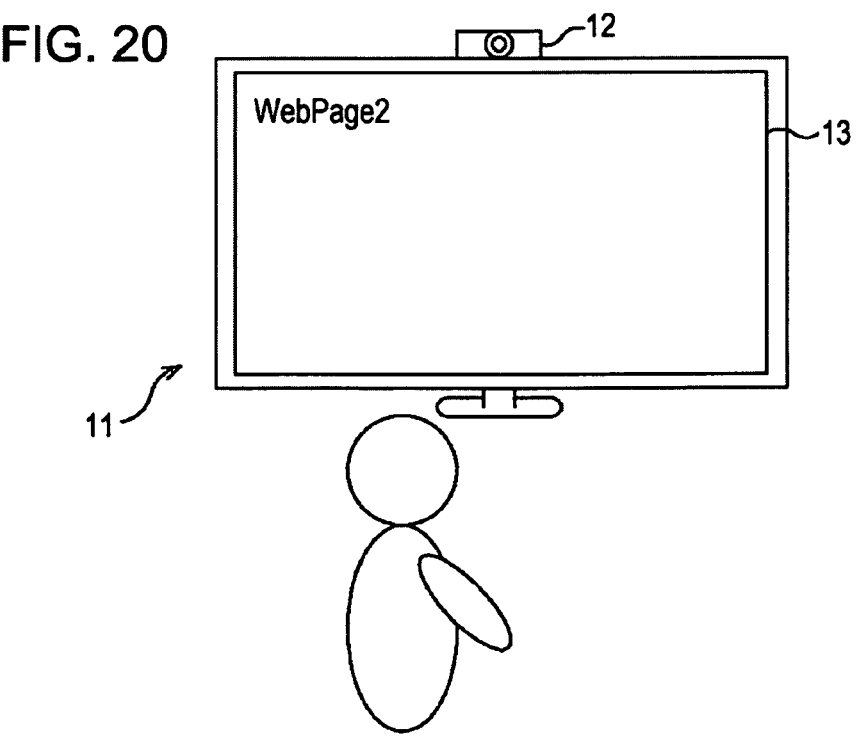
FIG. 20 is a diagram showing the second example of the use of the pointing device in the image processing apparatus shown in FIG. 2.

As a result, as shown in FIG. 20, the captured image, the feature-point pointer 83, and the UIs 91 to 93 are deleted from the display unit 13. That is, only the target to be viewed, i.e., the Web page (WebPage2), is displayed on the image-viewing screen of the display unit 13.

Accordingly, the image processing apparatus 11 allows hands-free cursor pointing based on the feature-point pointer 83 and the issuance of an event corresponding to a click of a mouse. Thus, the image processing apparatus 11 recognizes the position of a feature point as the position of a mouse, thereby controlling an existing browser to display a Web page without displaying the UIs 91 to 93 for Web browsers.

Next, image processing performed by the image processing apparatus 11 shown in FIG. 2 will be described with reference to FIG. 21. This image processing starts, for example, when a user operates an operation unit (not shown), such as a remote controller, to give an instruction to view a target image to be viewed.

In step S10, the combining unit 39 starts the display of the target image on the display unit 13. Specifically, the combining unit 39 starts an operation for obtaining the target image from an external apparatus (not shown) and supplying the target image to the display unit 13.

In step S11, the camera 12 starts an operation for obtaining a captured image frame-by-frame. The captured image is supplied to and stored in the frame buffer 32. The captured image is also supplied to the combining unit 39.

In step S12, it is determined, based on the captured image stored in the frame buffer 32, whether or not the trigger detection unit 33 has detected a trigger indicating that the user has waved their hand to the camera 12. If it is determined in step S12 that the trigger has not been detected, the process proceeds to step S22.

If it is determined in step S12 that the trigger has been detected, the trigger detection unit 33 supplies area information to the feature point extraction unit 34. Then in step S13, the feature point extraction unit 34 extracts one corner point as a feature point using the luminance component in an area of the captured image stored in the frame buffer 32, which is designated by the area information supplied from the trigger detection unit 33.

For example, in a case where the area information on the area 61 shown in FIG. 4 is supplied from the trigger detection unit 33 to the feature point extraction unit 34, the feature point extraction unit 34 extracts a single feature point using the luminance component in the area 61. The feature point extraction unit 34 supplies extracted-position information indicating the position of the extracted feature point to the calculation unit 35 and the UI drawing unit 36.

In step S14, the UI drawing unit 36 determines, based on the extracted-position information supplied from the feature point extraction unit 34, an arrangement of UIs so that the UIs can be arranged around the feature point. The UI drawing unit 36 supplies UI information on the UIs ands the UI images stored therein in advance to the combining unit 39. The UI drawing unit 36 also supplies the extracted-position information, or the feature point information supplied from the calculation unit 35, and the feature-point pointer image stored therein in advance to the combining unit 39. The UI drawing unit 36 further supplies the UI information to the command determination unit 37.

In step S15, the combining unit 39 starts the display of the single feature-point pointer and the UIs based on the information and images supplied from the UI drawing unit 36, namely, the UI information, the UI images, the extracted-position information or feature point information, and the feature-point pointer image.

Specifically, the combining unit 39 terminates the supply of the target image to the display unit 13. Then, the combining unit 39 starts an operation of combining the image of the single feature-point pointer and the UI images with the image of the image-viewing screen on the basis of the UI information, the UI images, the extracted-position information or feature point information, and the feature-point pointer image, and supplying the combined image to the display unit 13. Thus, for example, the feature-point pointer 14 and UIs 15 shown in FIG. 5 are displayed on the image-viewing screen of the display unit 13.

In step S16, the combining unit 39 starts the translucent display of the captured image using the captured image supplied from the image obtaining unit 31.

Specifically, the combining unit 39 starts an operation of producing a mirrored image of the captured image, and terminates the supply of the combined image, in which the image of the single feature-point pointer and the UI images are combined with the image of the image-viewing screen, to the display unit 13. The combining unit 39 further starts an operation of further combining the combined image obtained as a result of the combination, which was started in step S15, with the mirrored image of the captured image so that the mirrored image of the captured image can be displayed in a translucent manner on the image-viewing screen on which the image of the single feature-point pointer and the UI images are combined, and supplying the resulting combined image to the display unit 13. Thus, for example, as shown in FIG. 5, a horizontally flipped image of the captured image is displayed in a translucent manner on the image-viewing screen of the display unit 13.

In step S17, the calculation unit 35 calculates an optical flow of the single feature point on the basis of consecutive two frames of the captured image stored in the frame buffer 32 and the extracted-position information supplied from the feature point extraction unit 34 or the feature point information. Then, the calculation unit 35 recognizes, based on the optical flow, the current position of the feature point, and updates the feature point information. The calculation unit 35 supplies the feature point information to the UI drawing unit 36 and the command determination unit 37.

In step S18, the command determination unit 37 determines, based on the feature point information supplied from the calculation unit 35 and the UI information supplied from the UI drawing unit 36, whether or not to issue a command from the command issuing unit 38.

Specifically, for example, the command determination unit 37 determines, based on the feature point information and the UI information, whether or not a UI being currently displayed at the position of the feature point is found. If it is determined that a UI being currently displayed at the position of the feature point is found, the command determination unit 37 determines that a command is to be issued. If it is determined that such a UI is not found, the command determination unit 37 determines that no command is to be issued.

Furthermore, for example, the command determination unit 37 determines, based on the feature point information, whether or not, as shown in FIG. 16, the user's right hand grabbing the feature-point pointer 83 has performed a two-circular-motions-and-stop action. If it is determined that a two-circular-motions-and-stop action has been performed, the command determination unit 37 determines that a command is to be issued. If it is determined that a two-circular-motions-and-stop action has not been performed, the command determination unit 37 determines that no command is to be issued.

If it is determined in step S18 that a command is to be issued, the command determination unit 37 supplies an event corresponding to the command to be issued and identification information, or an event to be issued as the command or the command to the command issuing unit 38. Then in step S19, the command issuing unit 38 issues a command that is based on the event and identification information supplied from the command determination unit 37 or a command corresponding to the event or command supplied from the command determination unit 37.

For example, in a case where, as shown in FIG. 8, an event indicating an operation of the UIs 15 using the feature-point pointer 14, and identification information for identifying the UI 15-2, which has been operated, are supplied from the command determination unit 37, the command issuing unit 38 issues, based on the event and the identification information, a command for setting a television program of channel 3 as a target to be viewed.

Furthermore, in a case where after a two-circular-motions-and-stop action was performed in the manner shown in FIG. 16, the feature-point pointer 83 is superimposed on the link 82 in the manner shown in FIG. 17, and an event corresponding to a click of a mouse on the link 82 and a command for returning the color of the feature-point pointer 83 to the original color are supplied to the command determination unit 37, the command issuing unit 38 issues the supplied event and command as a command. After the processing of step S19, the process proceeds to step S20.

If it is determined in step S18 that no command is to be issued, the process skips step S19 and proceeds to step S20. In step S20, the combining unit 39 determines whether or not to terminate the display of interface-related images. Specifically, the combining unit 39 determines whether or not a command for terminating the display of interface-related images has been supplied from the command issuing unit 38.

If it is determined in step S20 that the display of interface-related images is not to be terminated, the process returns to step S17, and the optical flow of the feature point is calculated based on following two consecutive frames of the captured image stored in the frame buffer.32 and the feature point information updated at the previous iteration of the process. Then, the subsequent processing is performed.

If it is determined in step S20 that the display of interface-related images is to be terminated, then in step S21, the combining unit 39 terminates the display of the feature-point pointer, the UIs, and the captured image. Specifically, the combining unit 39 terminates the supply of the combined image to the display unit 13, which was started in step S16, and starts to supply the target image to the display unit 13. As a result, for example, as shown in FIG. 11, only the target image to be viewed, i.e., the image of the television program of channel 3, is displayed on the display unit 13. Then, the process proceeds to step S22.

In step S22, the combining unit 39 determines whether or not to terminate the viewing according to the operation of the operation unit (not shown) by the user. If it is determined in step S22 that the viewing is not to be terminated, the process returns to step S12 and the processing of steps S12 to S22 is repeated until it is determined that the viewing is to be terminated.

If it is determined in step S22 that the viewing is to be terminated, then in step S23, the image obtaining unit 31 terminates the operation for obtaining the captured image. In step S24, the combining unit 39 terminates the display of the target image. Specifically, the combining unit 39 terminates the operation for obtaining a target image from the external apparatus (not shown). Then, the process ends.

In the foregoing description, the image processing apparatus 11 is operated by a single user. The image processing apparatus 11 may be operated by a plurality of users.

Figure 22:
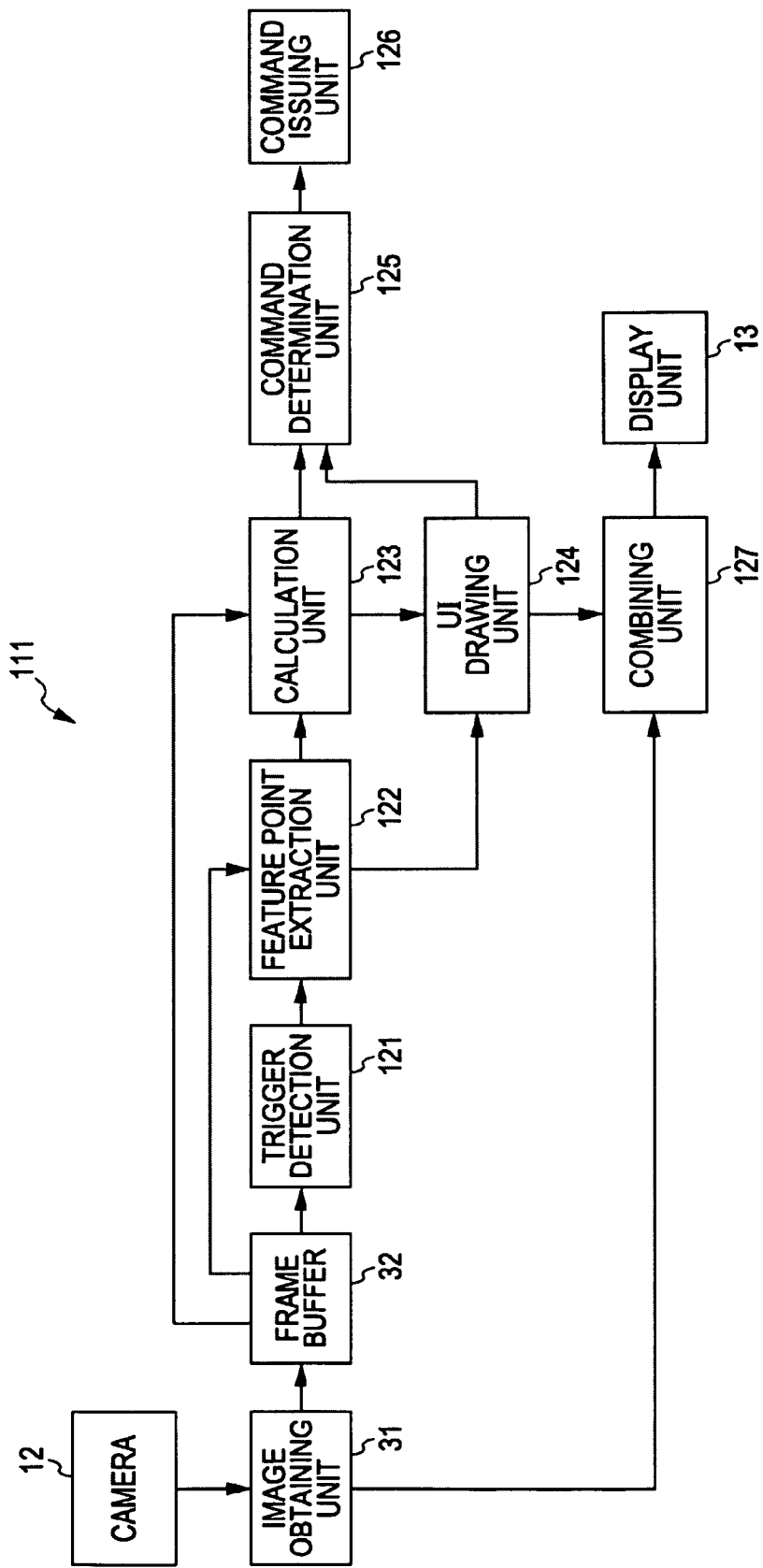
FIG. 22 is a block diagram showing an example structure of an image processing apparatus according to a second embodiment of the present invention.

FIG. 22 shows an example structure of an image processing apparatus which is operated by two users.

Referring to FIG. 22, an image processing apparatus 111 includes a camera 12, a display unit 13, an image obtaining unit 31, a frame buffer 32, a trigger detection unit 121, a feature point extraction unit 122, a calculation unit 123, a UI drawing unit 124, a command determination unit 125, a command issuing unit 126, and a combining unit 127. In FIG. 22, the components that are the same as or similar to those shown in FIG. 2 are denoted by the same reference numerals, and will not be redundantly described.

As with the trigger detection unit 33 shown in FIG. 2, the trigger detection unit 121 of the image processing apparatus 111 reads a captured image from the frame buffer 32. The trigger detection unit 121 detects, based on the captured image, a first trigger indicating that a first user has waved their hand to the camera 12. The trigger detection unit 121 supplies area information corresponding to the first trigger to the feature point extraction unit 122.

The trigger detection unit 121 further detects a second trigger indicating that a second user has waved their hand to the camera 12 within a predetermined period of time after the detection of the first trigger. The trigger detection unit 121 supplies area information corresponding to the second trigger to the feature point extraction unit 122.

As with the feature point extraction unit 34 shown in FIG. 2, the feature point extraction unit 122 reads the captured image from the frame buffer 32. The feature point extraction unit 122 extracts one corner point as a feature point of the first user using the luminance component in an area of the captured image designated by the area information corresponding to the first trigger supplied from the trigger detection unit 121, and supplies extracted-position information on the extracted feature point to the calculation unit 123 and the UI drawing unit 124.

The feature point extraction unit 122 further extracts a feature point of the second user in a manner similar to that for the first user using the luminance component in an area of the captured image designated by the area information corresponding to the second trigger, and supplies extracted-position information on the extracted feature point to the calculation unit 123 and the UI drawing unit 124.

As with the calculation unit 35 shown in FIG. 2, the calculation unit 123 reads two consecutive frames of the captured image from the frame buffer 32. The calculation unit 123 calculates, for each frame, the optical flow of the feature point of the first user on the basis of the read two frames of the captured image and the extracted-position information on the feature point of the first user supplied from the feature point extraction unit 122 or the feature point information on the first user. The calculation unit 123 recognizes, based on the optical flow, the current position of the feature point of the first user, and updates the feature point information on the feature point of the first user.

The calculation unit 123 further calculates the optical flow for the second user in a manner similar to that for the first user on the basis of the two frames of the captured image and the extracted-position information or feature point information on the feature point of the second user, and updates the feature point information on the feature point of the second user. The calculation unit 123 supplies the feature point information on the feature point of the first user and the feature point information on the feature point of the second user to the UI drawing unit 124 and the command determination unit 125.

The UI drawing unit 124 stores in advance feature-point pointers and UI images for the first and second users. The UI drawing unit 124 determines, based on the extracted-position information on the feature point of the first user supplied from the feature point extraction unit 122, an arrangement of UIs for the first user so that the UIs for the first user can be arranged around the feature point of the first user. The UI drawing unit 124 supplies UI information on the UIs for the first user and the UI images for the first user stored therein in advance to the combining unit 127.

The UI drawing unit 124 also supplies the extracted-position information on the feature point of the first user or the feature point information on the feature point of the first user, which is supplied from the calculation unit 123, and a feature-point pointer image of the feature point of the first user stored therein in advance to the combining unit 127. The UI drawing unit 124 further supplies the UI information on the UIs for the first user to the command determination unit 125.

The UI drawing unit 124 further supplies, in a manner similar to that for the first user, information and images for the second user, namely, the UI information on the UIs, the UI images, the extracted-position information or feature point information on the feature point, and the feature-point pointer image, to the combining unit 127. The UI drawing unit 124 further supplies, in a manner similar to that for the first user, the UI information on the UIs for the second user to the command determination unit 125.

The command determination unit 125 detects, based on the feature point information on the feature point of the first user supplied from the calculation unit 123 and the UI information on the UIs for the first user supplied from the UI drawing unit 124, one of the UIs of the first user that is being currently displayed at the position of the feature point of the first user. The command determination unit 125 supplies an event indicating the one of the UIs of the first user has been operated and identification information for identifying the one UI of the first user to the command issuing unit 126.

As with the command determination unit 37 shown in FIG. 2, the command determination unit 125 stores in advance a table in which motions of a feature point and events or commands are associated with each other. The command determination unit 125 recognizes, based on the feature point information supplied from the calculation unit 123, a locus of the position of the feature point of the first user, and reads an event or command associated with the motion indicated by the locus from the table stored therein in advance. The command determination unit 125 supplies the read event or command to the command issuing unit 126 as an event or command for the first user.

The command determination unit 125 further supplies, in a manner similar to that for the first user, an event for the second user and identification information, or an event or command of the second user to the command issuing unit 126.

As with the command issuing unit 38 shown in FIG. 2, the command issuing unit 126 stores in advance a table in which identification information and a command corresponding to a UI identified by the identification information are associated with each other. The command issuing unit 126 reads, based on the event and identification information on the first user supplied from the command determination unit 125, the command associated with the UI of the first user identified by the identification information, and issues the read command as a command for the first user.

The command issuing unit 126 further issues, as a command for the first user, the event or command for the first user supplied from the command determination unit 125. The command issuing unit 126 also issues a command of the second user in a manner similar to that for the first user.

The combining unit 127 obtains a first target image to be viewed by the first user and a second target image to be viewed by the second user from an external apparatus (not shown). Then, the combining unit 127 combines the first and second target images so that the first and second target images are displayed on half portions of the image-viewing screen, and sets the combined image as an image of an image-viewing screen.

The combining unit 127 supplies the image of the image-viewing screen to the display unit 13 for display. As a result, the first target image to be viewed by the first user is displayed on one half portion of the image-viewing screen of the display unit 13, and the second target image to be viewed by the second user is displayed on the other half portion of the image-viewing screen.

The combining unit 127 further combines the UI images and feature-point pointer images for the first and second users with the image of the image-viewing screen on the basis of the information and images for the first and second users supplied from the UI drawing unit 124, namely, the UI information, the UI images, the extracted-position information or feature point information, and the feature-point pointers images.

As with the combining unit 39 shown in FIG. 2, further, the combining unit 127 produces a mirrored image of the captured image supplied from the image obtaining unit 31. The combining unit 127 further combines the mirrored image of the captured image with the combined image of the image-viewing screen so that the mirrored image of the captured image can be displayed in a translucent manner on the image-viewing screen on which the UI images and feature-point pointers for the first and second users are combined. The combining unit 127 supplies the resulting combined image to the display unit 13 for display.

The use of pointing devices in the image processing apparatus 111 shown in FIG. 22 will now be described with reference to FIG. 23.

Figure 23:
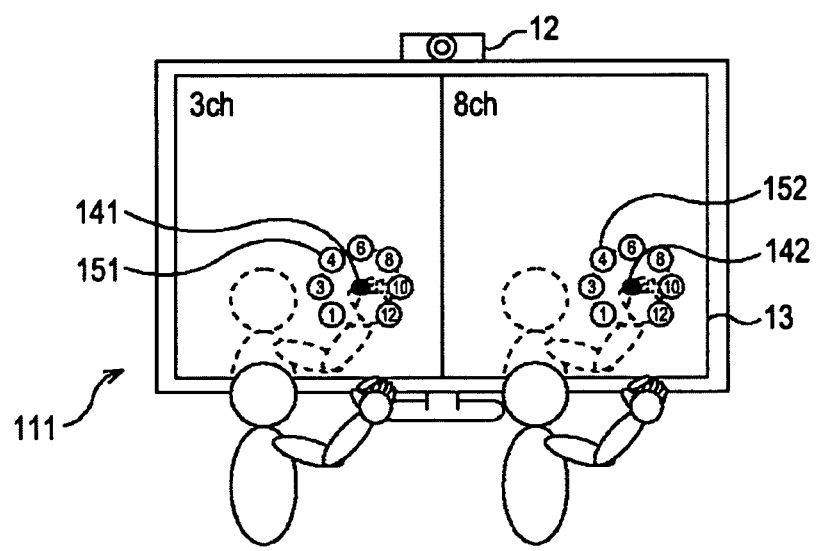
FIG. 23 is a diagram showing an example of the use of pointing devices in the image processing apparatus shown in FIG. 22.

In the example shown in FIG. 23, a first user desires to view a television program on channel 3, and a second user desires to view a television program on channel 8. In FIG. 23, an image of the television program of channel 3 is displayed on the left half portion of the image-viewing screen of the display unit 13, and an image of the television program of channel 8 is displayed on the right half portion of the image-viewing screen.

When the first user waves their hand to the camera 12 from the left side with respect to the camera 12 and the second user waves their hand to the camera 12 from the right side with respect to the camera 12, feature points for the first and second users are extracted in areas where the waving of the users' hands has been detected. Thus, as shown in FIG. 23, a first feature-point pointer 141 indicating the feature point for the first user is displayed on the left half portion of the image-viewing screen of the display unit 13, and a second feature-point pointer 142 indicating the feature point for the second user is displayed on the right half portion of the image-viewing screen.

Further, as shown in FIG. 23, UIs 151 of the first user are displayed on the left half portion of the image-viewing screen of the display unit 13 on the basis of the extracted-position information on the feature point of the first user, and UIs 152 of the second user are displayed on the right half portion of the image-viewing screen on the basis of the extracted-position information on the feature point of the second user. As shown in FIG. 23, captured images of the first and second users are also displayed in a translucent manner on the display unit 13. In the example shown in FIG. 23, the UIs 151 are formed of UIs similar to the UIs 15-1 to 15-7 shown in FIG. 1, and the UIs 152 are formed of UIs similar to the UIs 15-1 to 15-7 shown in FIG. 1. The UIs 151 and 152 are operated to select each channel.

Accordingly, the first and second feature-point pointers 141 and 142 and the UIs 151 and 152 for the two users are displayed on the display unit 13. This allows one of the two users to grab the first feature-point pointer 141 to select a channel of a television program desired to be viewed, and allows the other user to grab the second feature-point pointer 142 to select a channel of a television program desired to be viewed.

Figure 24:
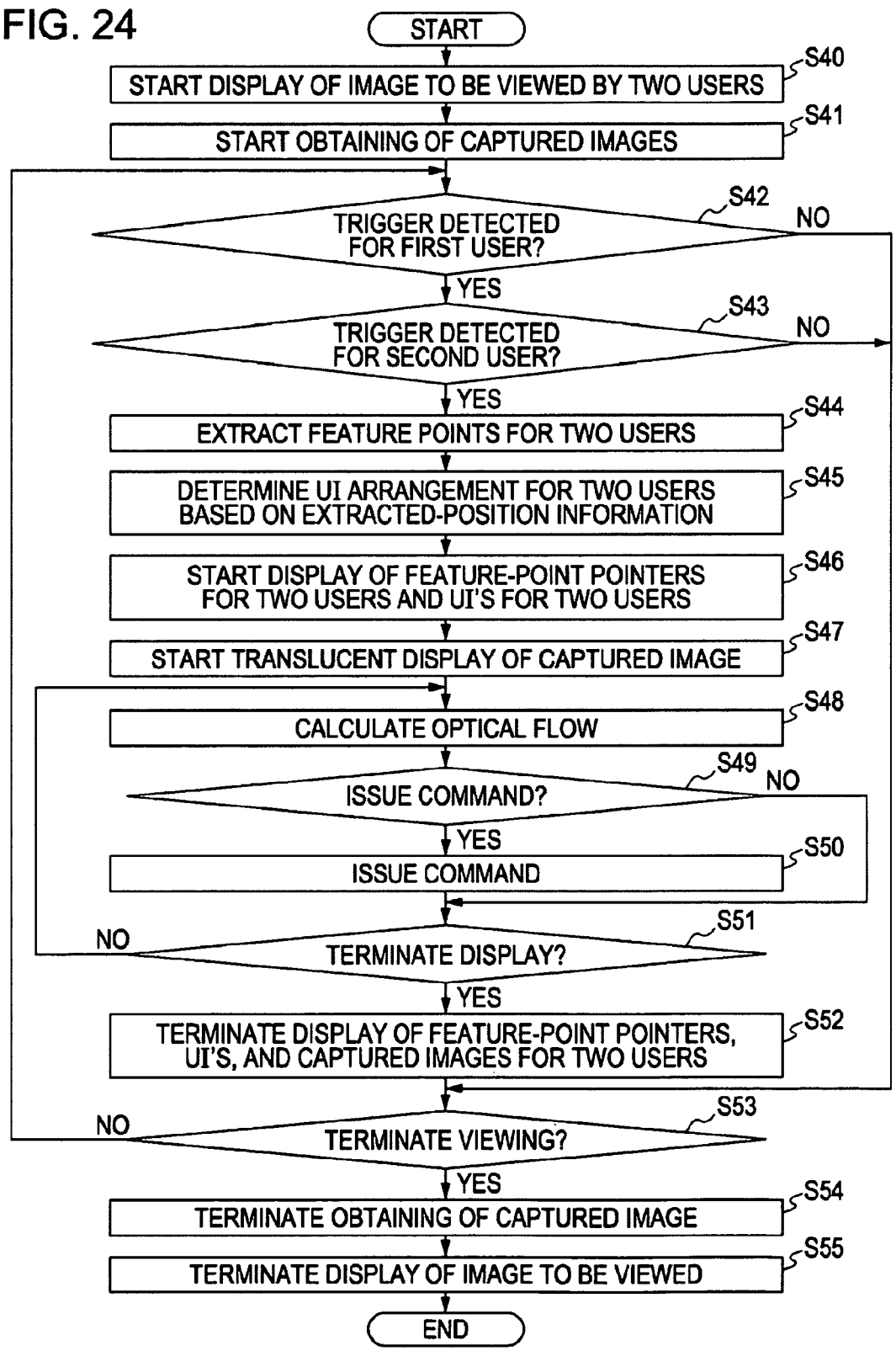
FIG. 24 is a flowchart showing image processing performed by the image processing apparatus shown in FIG. 22.

Next, image processing performed by the image processing apparatus 111 shown in FIG. 22 will be described with reference to FIG. 24. This image processing starts, for example, when users operate operation units (not shown), such as remote controllers, to give instructions to view target images to be viewed.

In step S40, the combining unit 127 starts the display of the target images to be viewed by the two users. Specifically, the combining unit 127 starts an operation for obtaining a target image to be viewed by a first user and a target image to be viewed by a second user from an external apparatus (not shown), combining the obtained target images to produce an image of the image-viewing screen, and supplying the image of the image-viewing screen to the display unit 13. Thus, for example, as shown in FIG. 23, the target image to be viewed by the first user is displayed on the left half portion of the image-viewing screen of the display unit 13, and the target image to be viewed by the second user is displayed on the right half portion of the image-viewing screen.

Figure 21:
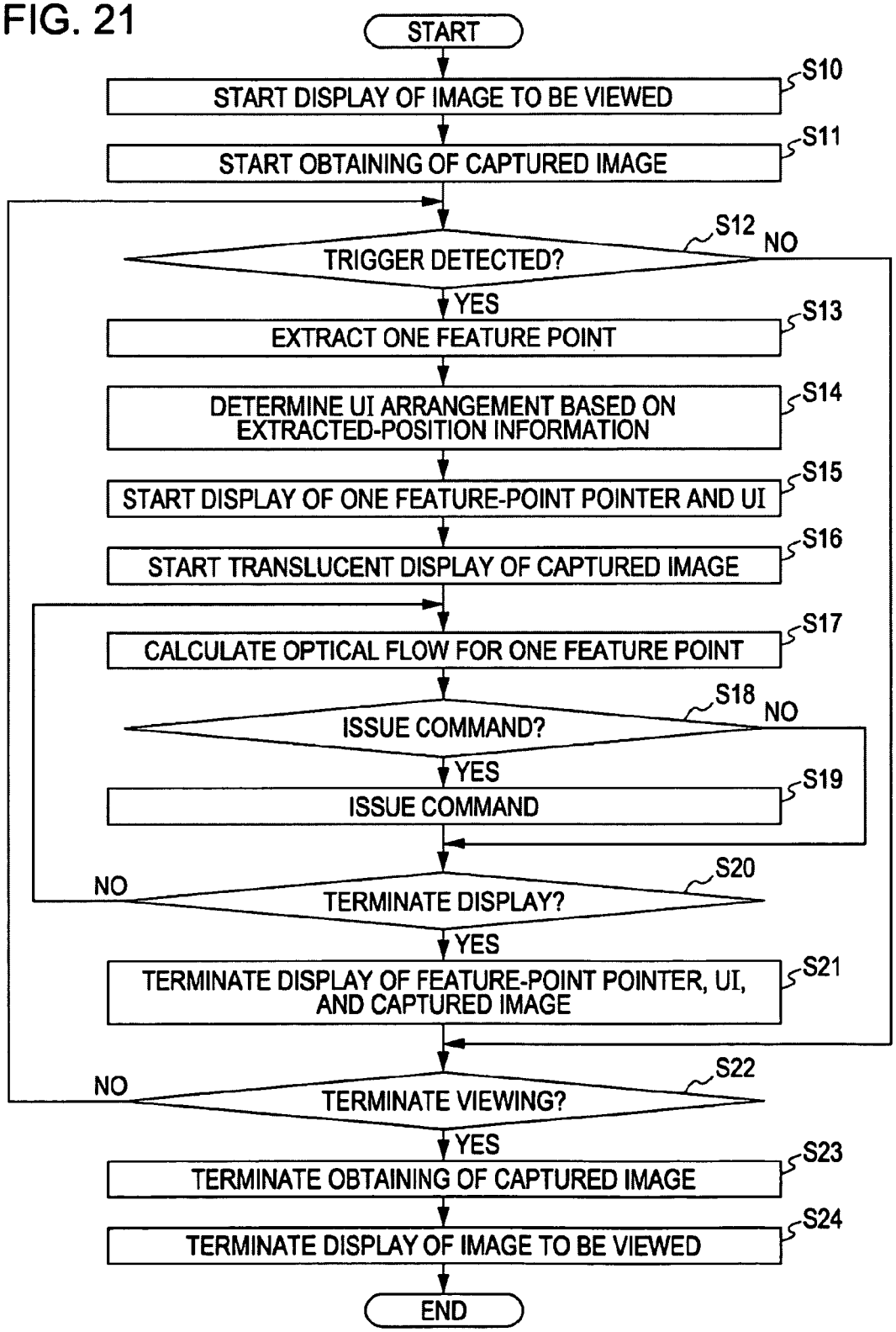
FIG. 21 is a flowchart showing image processing performed by the image processing apparatus shown in FIG. 2.

In step S41, as in step S11 shown in FIG. 21, the camera 12 starts an operation for obtaining a captured image frame-by-frame. The captured image is supplied to and stored in the frame buffer 32. The captured image is also supplied to the combining unit 127.

In step S42, it is determined, based on the captured image stored in the frame buffer 32, whether or not the trigger detection unit 121 has detected a first trigger indicating that the first user has waved their hand to the camera 12. If it is determined in step S42 that the first trigger has not been detected, the process proceeds to step S53.

If it is determined in step S42 that the first trigger has been detected, the trigger detection unit 121 supplies area information corresponding to the first trigger to the feature point extraction unit 122. Then in step S43, it is determined whether or not the trigger detection unit 121 has detected a second trigger for the second user within a predetermined period of time after the detection of the first trigger. If it is determined in step S43 that the second trigger has not been detected, the process proceeds to step S53.

If it is determined in step S43 that the second trigger has been detected, the trigger detection unit 121 supplies area information corresponding to the second trigger to the feature point extraction unit 122.

Then in step S44, the feature point extraction unit 122 extracts a feature point for the first user using the luminance component in an area of the captured image stored in the frame buffer 32, which is designated by the area information corresponding to the first trigger supplied from the trigger detection unit 121, and extracts a feature point for the second user using the luminance component in an area of the captured image designated by the area information corresponding to the second trigger supplied from the trigger detection unit 121. The feature point extraction unit 122 supplies extracted-position information indicating the position of the feature point of the first user and extracted-position information indicating the position of the feature point of the second user to the calculation unit 123 and the UI drawing unit 124.

In step S45, the UI drawing unit 124 determines, based on the extracted-position information on the two users supplied from the feature point extraction unit 122, an arrangement of UIs for the two users so that the UIs for the first user can be arranged around the feature point of the first user and the UIs for the second user can be arranged around the feature point of the second user. The UI drawing unit 124 supplies UI information on the UIs for the two users and the UI images for the two users stored therein in advance to the combining unit 127. The UI drawing unit 124 also supplies the extracted-position information on the two users, or the feature point information on the feature points of the two users supplied from the calculation unit 123, and the feature-point pointer images for the two users stored therein in advance to the combining unit 127. The UI drawing unit 124 further the UI information on the two users to the command determination unit 125.

In step S46, the combining unit 127 starts the display of the feature-point pointers for the two users and the UIs for the two users based on the information and images for the two users supplied from the UI drawing unit 124, namely, the UI information, the UI images, the extracted-position information or feature point information, and the feature-point pointer images.

The processing of steps S47 to S55 is similar to the processing of steps S16 to S24 shown in FIG. 21, respectively, and will not be described herein. The processing of steps S48 to S50 is performed for each feature point.

In the example described above, two users grab the feature-point pointers 141 and 142 to select desired channels to be displayed on individual screen portions of an image-viewing screen of the display unit 13. Alternatively, as shown in FIG. 25, two users may select a channel to be displayed on the entire image-viewing screen of the display unit 13.

Figure 25:
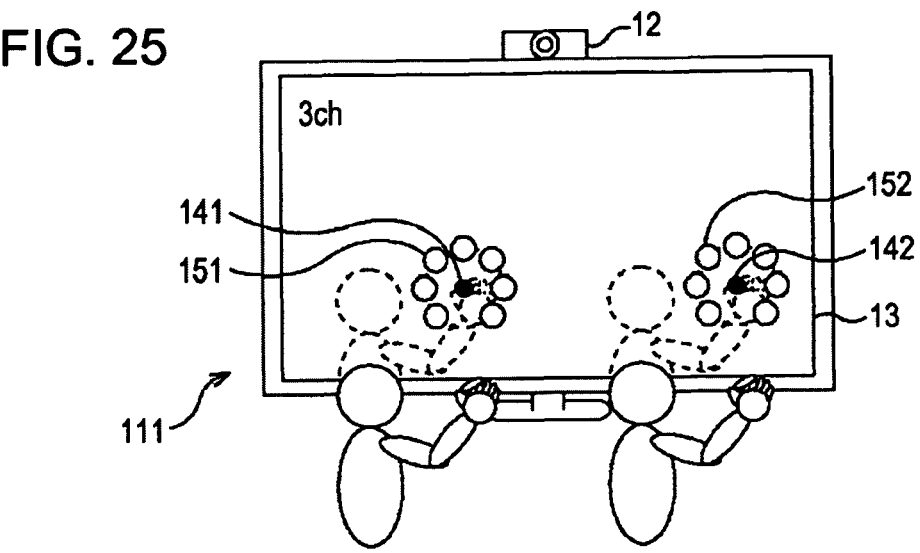
FIG. 25 is a diagram showing an example of an operation performed by two users.

In the example shown in FIG. 25, an image of a television program of channel 3 is displayed on the entire image-viewing screen of the display unit 13 as a target image to be viewed. The users grab and operate the feature-point pointers 141 and 142 to select a channel of a television program to be displayed on the entire image-viewing screen of the display unit 13.

Figure 26:
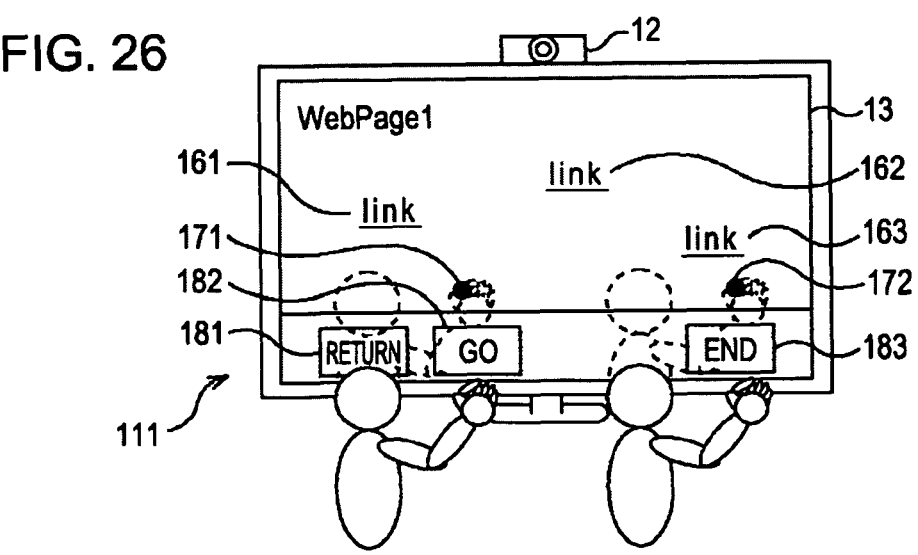
FIG. 26 is a diagram showing another example of an operation performed by two users.

Alternatively, as shown in FIG. 26, UIs may be shared by two users. In the example shown in FIG. 26, two feature-point pointers 171 and 172 and three UIs 181 to 183 are shared by two users and are displayed on a Web page (WebPage3) having three links 161 to 163, which is an image to be viewed. Captured images of the users are further displayed in a translucent manner on the Web page (WebPage3). Thus, a user can operate the UIs 181 to 183 using either the feature-point pointer 171 or 172.

While the image processing apparatus 111 shown in FIG. 22 is operated by two users using two feature-point pointers, an image processing apparatus may be operated by a single user using a plurality of feature-point pointers.

Figure 27:
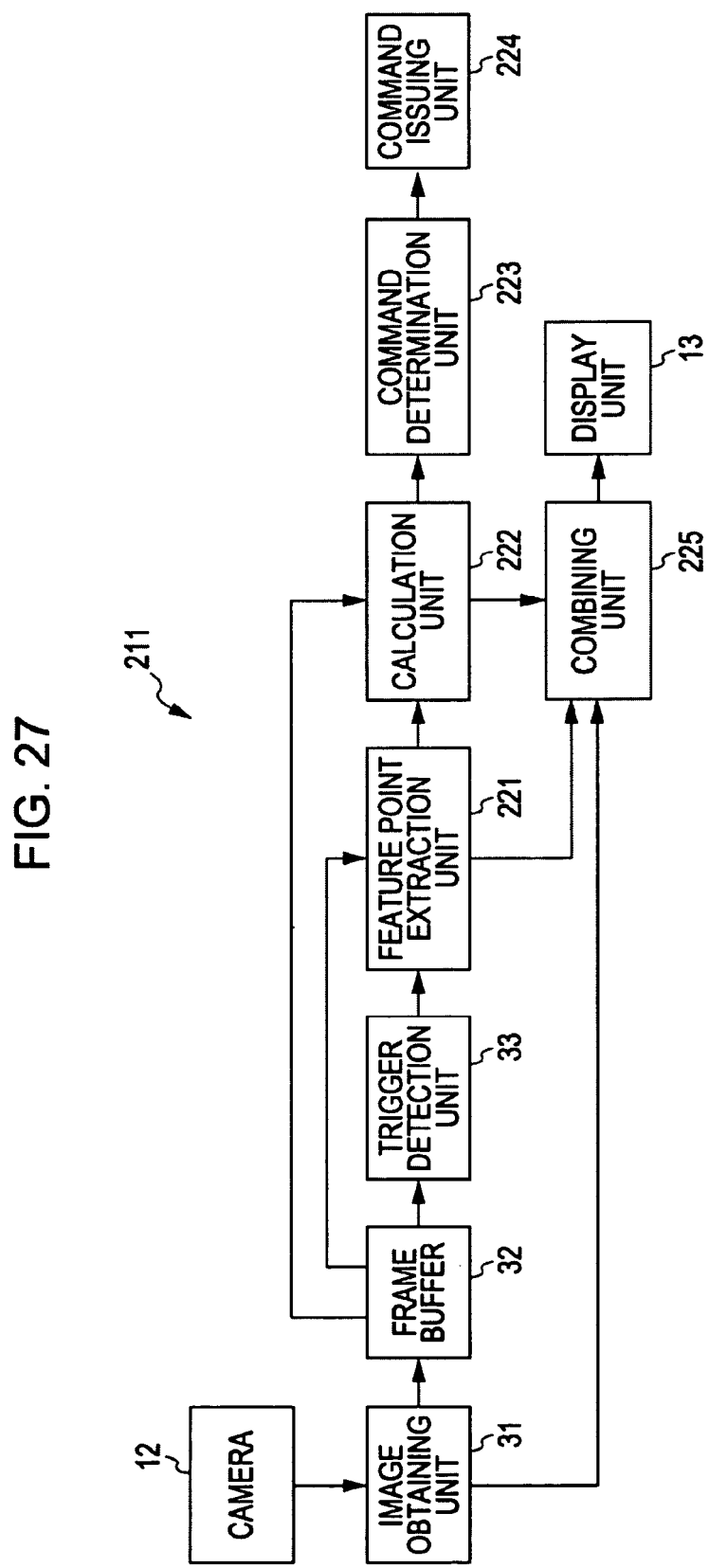
FIG. 27 is a block diagram showing an example structure of an image processing apparatus according to a third embodiment of the present invention.

FIG. 27 shows an example structure of an image processing apparatus which is operated by a single user using two feature-point pointers.

Referring to FIG. 27, an image processing apparatus 211 includes a camera 12, a display unit 13, an image obtaining unit 31, a frame buffer 32, a trigger detection unit 33, a feature point extraction unit 221, a calculation unit 222, a command determination unit 223, a command issuing unit 224, and a combining unit 225. In FIG. 27, the components that are the same as or similar to those shown in FIG. 2 are denoted by the same reference numerals, and will not be redundantly described.

As with the feature point extraction unit 34 shown in FIG. 2, the feature point extraction unit 221 of the image processing apparatus 211 reads a captured image from the frame buffer 32. The feature point extraction unit 221 extracts two corner points as feature points using the luminance component in an area of the captured images designated by area information supplied from the trigger detection unit 33, and supplies extracted-position information on the two feature points to the calculation unit 222 and the combining unit 225.

As with the calculation unit 35 shown in FIG. 2, the calculation unit 222 reads two consecutive frames of the captured image from the frame buffer 32. The calculation unit 222 calculates, for each frame, the optical flows of the two feature points on the basis of the read two frames of the captured image and the extracted-position information on the two feature points supplied from the feature point extraction unit 221 or the feature point information on the two feature points. The calculation unit 222 updates the feature point information on the two feature points on the basis of the two optical flows, and supplies the updated feature point information to the command determination unit 223 and the combining unit 225.

The command determination unit 223 stores in advance a table in which motions of two feature points and commands are associated with each other. The command determination unit 223 recognizes, based on the feature point information on the two feature points, loci of the positions of the two feature points, and reads commands corresponding to the motions indicated by the loci from the table stored therein in advance. The command determination unit 223 supplies the read commands and the feature point information on the two feature points to the command issuing unit 224.

The command issuing unit 224 issues a command using the feature point information or a command without using the feature point information according to the commands supplied from the command determination unit 223.

As with the combining unit 39 shown in FIG. 2, the combining unit 225 obtains an image of content desired to be viewed from an external apparatus (not shown). Then, as with the combining unit 39, the combining unit 225 supplies an image including the desired image to the display unit 13 so that the image is directly displayed as an image of an image-viewing screen.

The combining unit 225 further combines, based on the extracted-position information supplied from the feature point extraction unit 221, or the feature point information supplied from the calculation unit 222, and the feature-point pointer images stored therein in advance, the feature-point pointer images with the image of the image-viewing screen.

Further, as with the combining unit 39 shown in FIG. 2, the combining unit 225 produces a mirrored image of the captured image supplied from the image obtaining unit 31. The combining unit 225 further combines the mirrored image of the captured image with the combined image of the image-viewing screen so that the mirrored image of the captured image can be displayed in a translucent manner on the image-viewing screen on which the feature-point pointers are combined. The combining unit 225 supplies the resulting combined image to the display unit 13 for display.

The use of pointing devices in the image processing apparatus 211 will now be described with reference to FIGS. 28 to 38.

Figure 28:
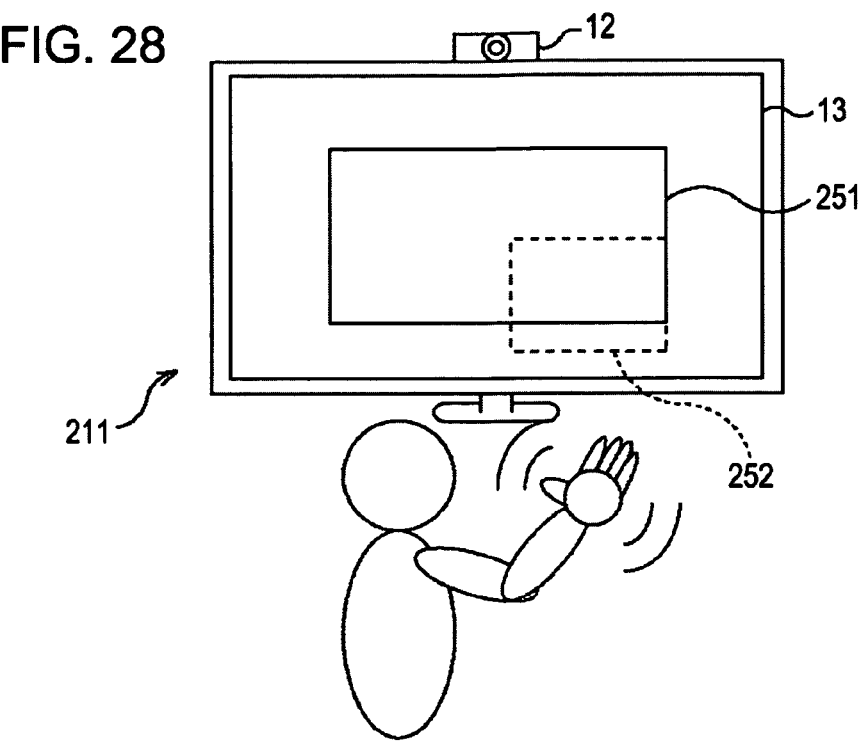
FIG. 28 is a diagram showing an example of the use of pointing devices in the image processing apparatus shown in FIG. 27.

As shown in FIG. 28, first, a user waves their hand to the camera 12 during display of a photograph 251 to be viewed. In the image processing apparatus 211, the waving of the hand of the user is detected as a trigger within an area 252, and two feature points are extracted in the area 252.

Figure 29:
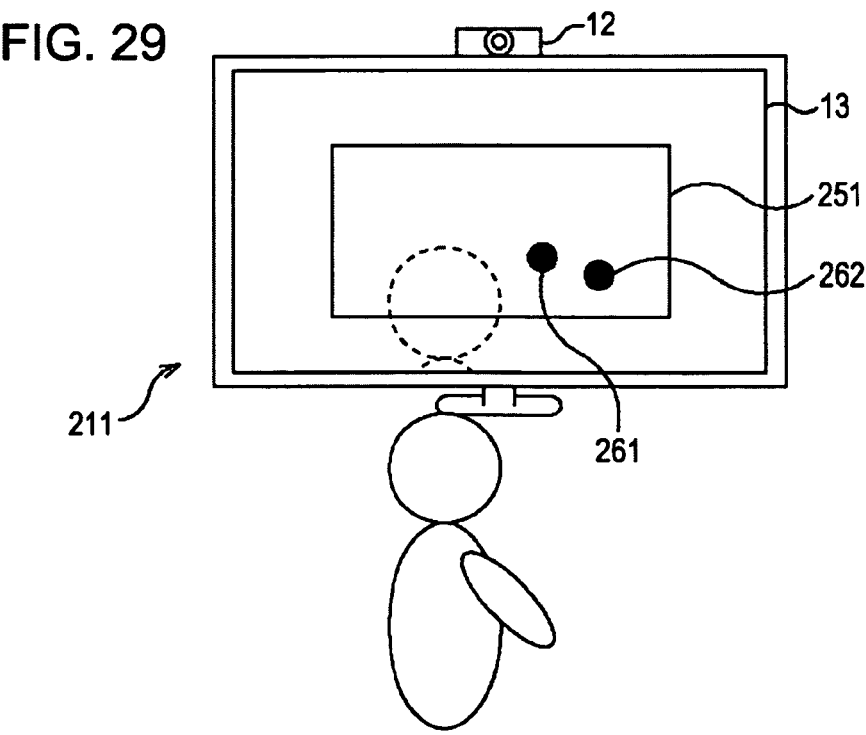
FIG. 29 is a diagram showing the example of the use of the pointing devices in the image processing apparatus shown in FIG. 27.

Then, as shown in FIG. 29, on the display unit 13, a mirrored image of a captured image is displayed in a translucent manner on an image-viewing screen on which the photograph 251 is being currently displayed, and feature-point pointers 261 and 262 are displayed on the basis of the two feature points.

Then, as shown in FIG. 30, the user encloses a volume of space corresponding to the feature-point pointer 261 with the fingers of their left hand from the left and right sides and a volume of space corresponding to the feature-point pointer 262 with the fingers of their right hand from the left and right sides, while viewing the feature-point pointers 261 and 262 being currently displayed on the display unit 13.

Then, as shown in FIG. 31, the left hand of the user closes around the volume of space corresponding to the feature-point pointer 261, and the right hand of the user closes around the volume of space corresponding to the feature-point pointer 262. That is, the user grabs the feature-point pointers 261 and 262 with their left and right hands, respectively.

Figure 32:
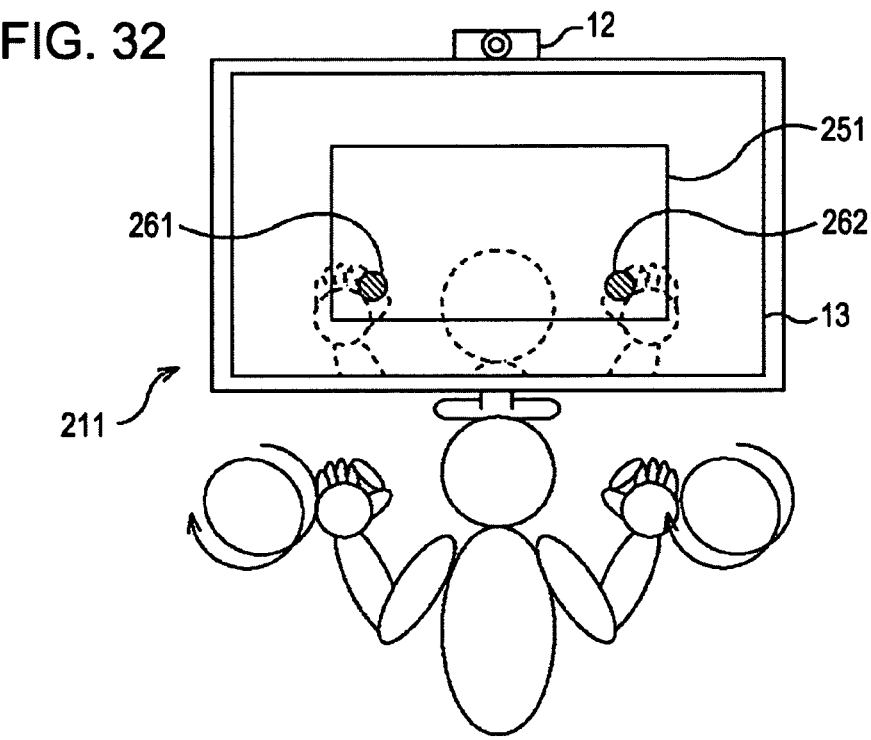
FIG. 32 is a diagram showing the example of the use of the pointing devices in the image processing apparatus shown in FIG. 27.

Then, the user moves their hands so that the feature-point pointers 261 and 262 being currently displayed on the display unit 13 can be arranged side-by-side in a horizontal direction, i.e., a left-right direction, so that, for example, as shown in FIG. 32, the hands grabbing the feature-point pointers 261 and 262 perform a two-circular-motions-and-stop action. Thus, the image processing apparatus 211 issues, as commands corresponding to the two-circular-motions-and-stop action of the hands, a command for changing the color of the feature-point pointers 261 and 262 and a command for fixing the positional relationship between the photograph 251 and the feature-point pointers 261 and 262.

As a result, as shown in FIG. 32, the color of the feature-point pointers 261 and 262 is first changed to, for example, red. Then, a transition is made to a state where, as shown in FIG. 33, the feature-point pointers 261 and 262 capture the photograph 251, and the color of the feature-point pointers 261 and 262 is changed to, for example, blue.

Figure 34:
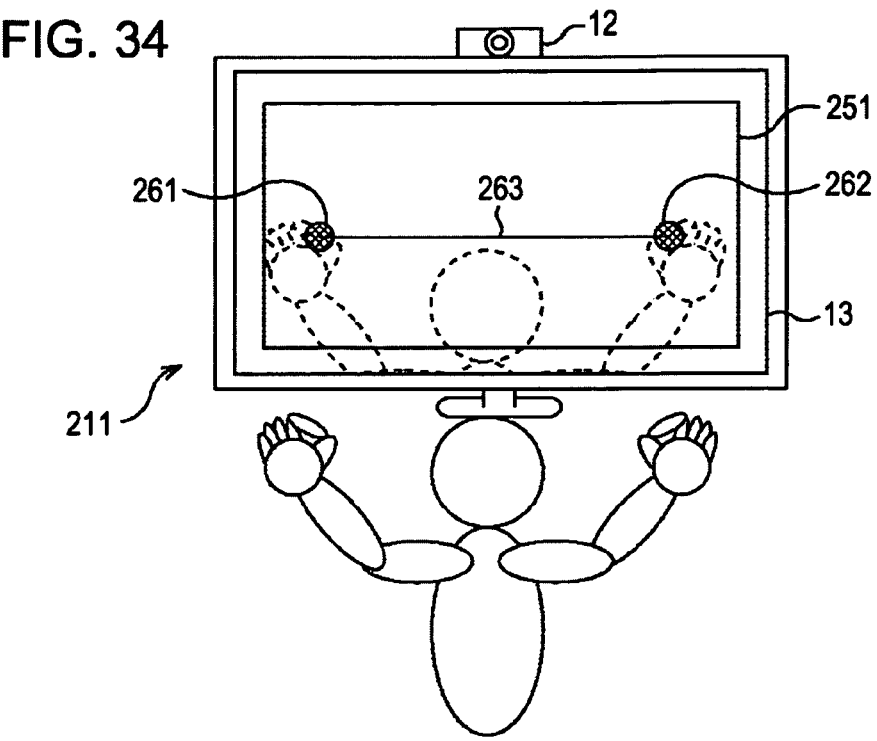
FIG. 34 is a diagram showing the example of the use of the pointing devices in the image processing apparatus shown in FIG. 27.

Then, as shown in FIG. 34, the user moves their left hand grabbing the feature-point pointer 261 and their right hand grabbing the feature-point pointer 262 to the left and right with respect to the camera 12, respectively, to increase the distance between the right and left hands in the horizontal direction. Thus, a command for enlarging the photograph 251 without changing the positional relationship between the photograph 251 and the feature-point pointers 261 and 262 is issued.

Figure 33:
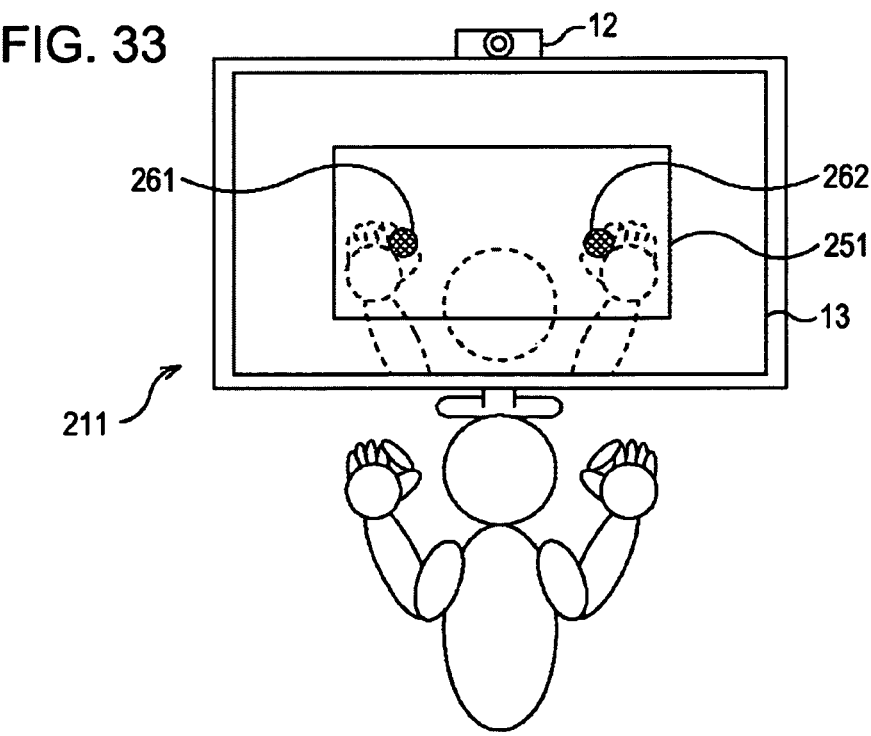
FIG. 33 is a diagram showing the example of the use of the pointing device in the image processing apparatus shown in FIG. 27.

As a result, as shown in FIG. 34, the photograph 251 is enlarged in the horizontal direction in proportion to the increase in the distance between the feature-point pointers 261 and 262 after the movement shown in FIG. 34 relative to the original distance between the feature-point pointers 261 and 262 before the movement shown in FIG. 33.

Although not shown in a figure, the user may move their left hand grabbing the feature-point pointer 261 and their right hand grabbing the feature-point pointer 262 to the right and left with respect to the camera 12, respectively, to decrease the distance between the right and left hands in the horizontal direction to reduce the photograph 251 in the horizontal direction. In this case, the photograph 251 is reduced in the horizontal direction in proportion to the decrease in the distance between the feature-point pointers 261 and 262 after the movement relative to the distance between the feature-point pointers 261 and 262 before the movement.

Furthermore, although not shown in a figure, the user may perform a two-circular-motions-and-stop action after positioning their left hand grabbing the feature-point pointer 261 and their right hand grabbing the feature-point pointer 262 side-by-side in a vertical direction, i.e., an up-down direction, and may increase or decrease the distance between the hands in the vertical direction to thereby enlarge or reduce the photograph 251 in the vertical direction.

Figure 35:
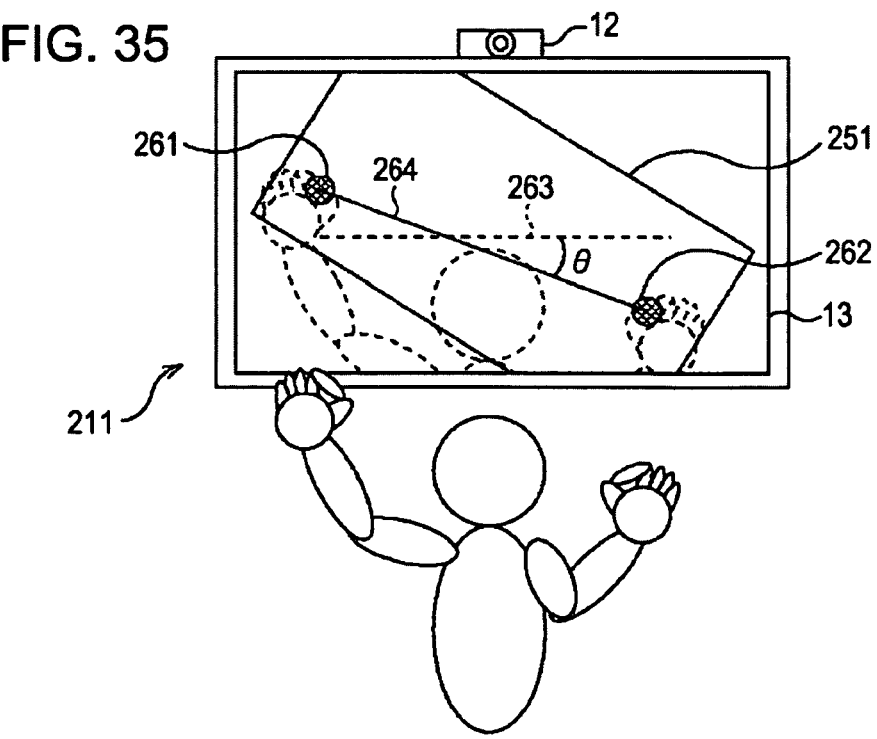
FIG. 35 is a diagram showing the example of the use of the pointing devices in the image processing apparatus shown in FIG. 27.

Then, as shown in FIG. 35, the user moves their left hand grabbing the feature-point pointer 261 and their right hand grabbing the feature-point pointer 262 in a clockwise direction through a predetermined angle. Thus, a command for rotating the photograph 251 without changing the positional relationship between the photograph 251 and the feature-point pointers 261 and 262 is issued.

As a result, as shown in FIG. 35, the photograph 251 is rotated clockwise through an angle θ, which is defined between a feature line 263 connecting the feature-point pointers 261 and 262 before the rotation shown in FIG. 34 and a feature line 264 after the rotation shown in FIG. 35. The feature lines 263 and 264 may or may not be displayed on the display unit 13.

Then, as shown in FIG. 36, the user stops for two seconds in the state shown in FIG. 35. In response to this action, a command for changing the color of the feature-point pointers 261 and 262 to the original color and a command for releasing the fixed positional relationship between the photograph 251 and the feature-point pointers 261 and 262 are issued.

As a result, as shown in FIG. 36, the color of the feature-point pointers 261 and 262 is returned to the original color. Then, the capturing of the photograph 251 by the feature-point pointers 261 and 262 is completed.

Then, as shown in FIG. 37, the user moves their left hand grabbing the feature-point pointer 261 and their right hand grabbing the feature-point pointer 262 downward with respect to the camera 12 so that the feature-point pointers 261 and 262 can be positioned outside the image-viewing screen of the display unit 13. Thus, a command for terminating the interface display process is issued.

Figure 38:
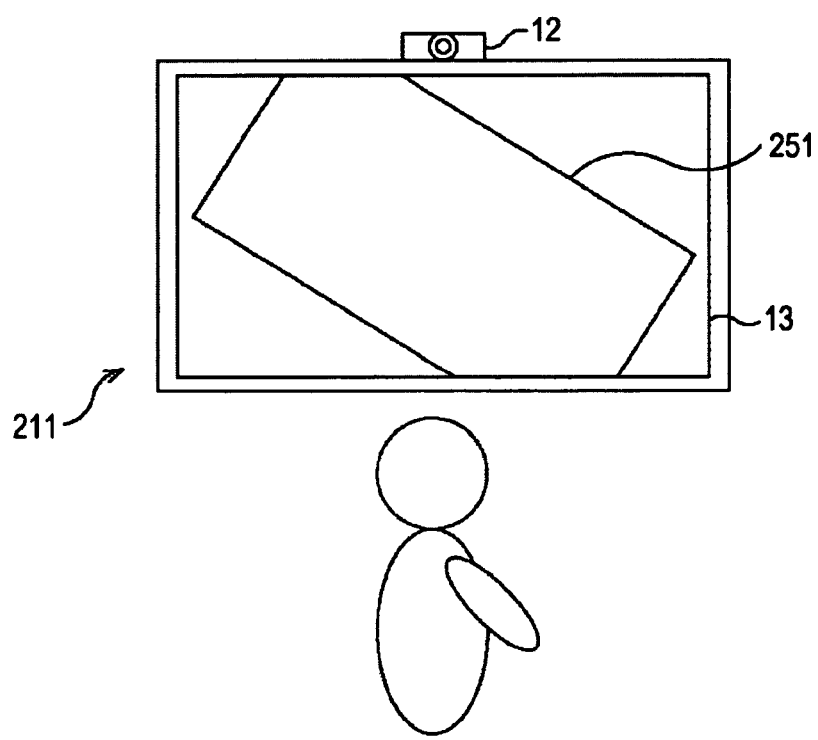
FIG. 38 is a diagram showing the example of the use of the pointing devices in the image processing apparatus shown in FIG. 27.

As a result, as shown in FIG. 38, the captured image and the feature-point pointers 261 and 262 are deleted from the display unit 13. That is, only the target to be viewed, i.e., the photograph 251, is displayed on the image-viewing screen of the display unit 13.

The case where a user enlarges, reduces, or rotates the photograph 251 has been described with reference to FIGS. 28 to 38. The user may move the photograph 251 by moving their left hand grabbing the feature-point pointer 261 and their right hand grabbing the feature-point pointer 262 without changing the distance therebetween.

Any operation other than a two-circular-motions-and-stop action of the user's hands may be used as a trigger to make a transition to the state where the feature-point pointers 261 and 262 capture the photograph 251. For example, a user may move their hand grabbing at least one of the feature-point pointers 261 and 262 so that at least one of the feature-point pointers 261 and 262 can be superimposed on a predetermined UI being currently displayed on the display unit 13, and this operation may be detected as a trigger.

Figure 39:
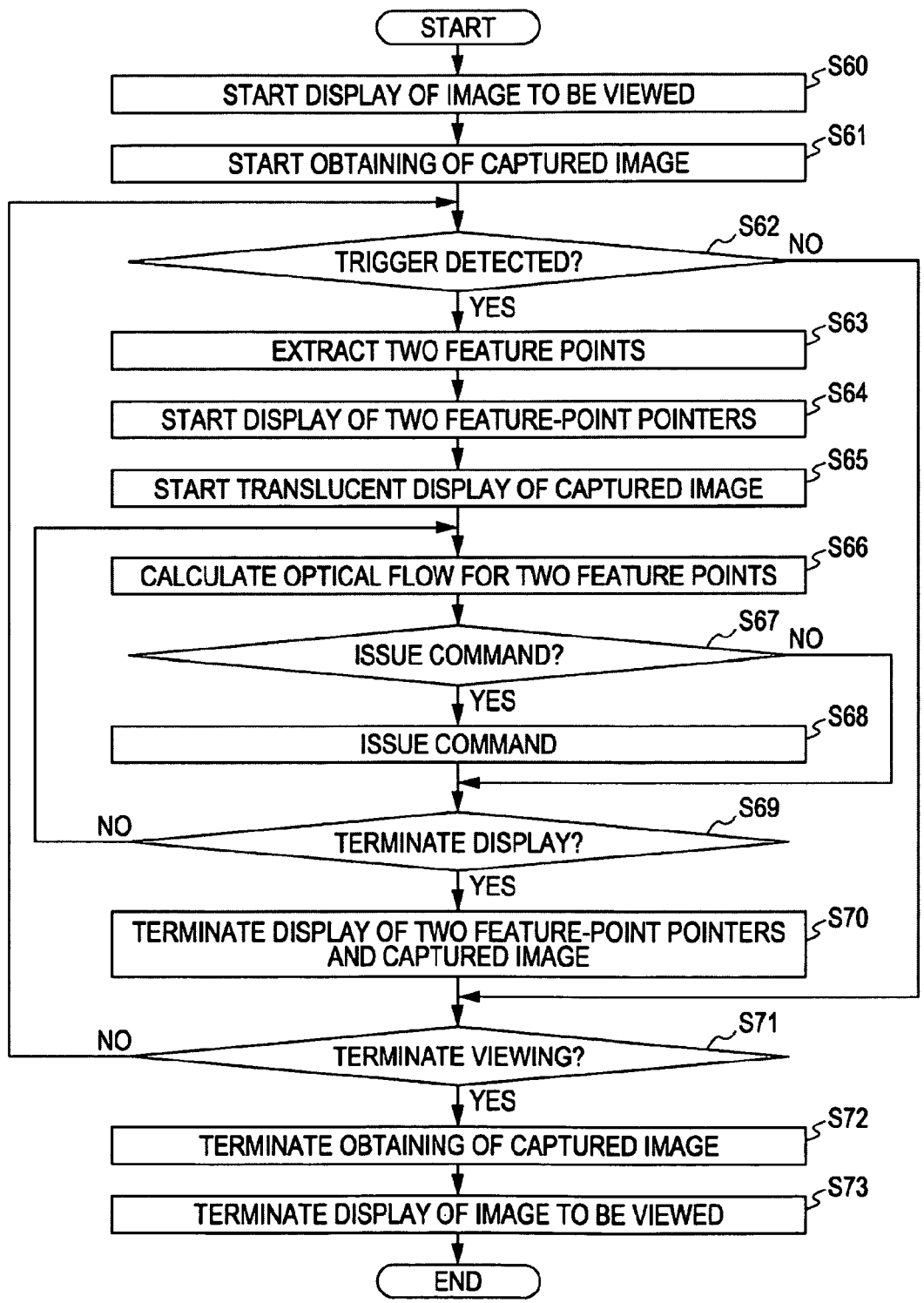
FIG. 39 is a flowchart showing image processing performed by the image processing apparatus shown in FIG. 27.

Next, image processing performed by the image processing apparatus 211 shown in FIG. 27 will be described with reference to FIG. 39. This image processing starts, for example, when a user operates an operation unit (not shown), such as a remote controller, to give an instruction to view a target image to be viewed.

The processing of steps S60 to S62 is similar to the processing of steps S10 to S12 shown in FIG. 21, respectively, and will not be described herein.

In step S63, the feature point extraction unit 221 extracts two corner points as feature points using the luminance component in an area of the captured image stored in the frame buffer 32, which is designated by the area information supplied from the trigger detection unit 33. The feature point extraction unit 221 supplies extracted-position information indicating the positions of the extracted feature points to the calculation unit 222 and the combining unit 225.

In step S64, the combining unit 225 starts the display of the two feature-point pointers based on the extracted-position information on the two feature points supplied from the feature point extraction unit 221, or the feature point information on the two feature point supplied from the calculation unit 222, and feature-point pointer images. As a result, for example, as shown in FIG. 29, the two feature-point pointers 261 and 262 are displayed on the image-viewing screen of the display unit 13.

In step S65, as in the processing of step S16 shown in FIG. 21, the combining unit 225 starts the translucent display of the captured image using the captured image supplied from the image obtaining unit 31. As a result, for example, as shown in FIG. 29, a horizontally flipped image of the captured image is displayed in a translucent manner on the image-viewing screen of the display unit 13.

In step S66, the calculation unit 222 calculates optical flows of the two feature points on the basis of two frames of the captured image stored in the frame buffer 32 and the extracted-position information on the two feature points supplied from the feature point extraction unit 221 or the feature point information on the two feature points. Then, the calculation unit 222 updates the feature point information on each of the feature points according to the optical flow of each of the feature points. The calculation unit 222 supplies the feature point information on the two feature points to the command determination unit 223 and the combining unit 225.

In step S67, the command determination unit 223 determines, based on the feature point information on the two feature points supplied from the calculation unit 222, whether or not to issue a command from the command issuing unit 224.

Specifically, the command determination unit 223 recognizes, based on the feature point information on the two feature points, loci of the positions of the two feature points, and determines whether or not commands associated with the motions indicated by the loci are included in the table stored therein in advance. If it is determined that the commands are included in the table stored in advance, the command determination unit 223 determines that a command is to be issued. If it is determined that the commands are not included in the table, the command determination unit 223 determines that no command is to be issued.

If it is determined in step S67 that a command is to be issued, the command determination unit 223 supplies commands corresponding the motions of the two feature points and feature point information to the command issuing unit 224. Then in step S68, the command issuing unit 224 issues a command using the feature point information or a command without using the feature point information according to the commands supplied from the command determination unit 223.

Specifically, for example, as shown in FIG. 32, in a case where the user performs a two-circular-motions-and-stop action of their hands grabbing the feature-point pointers 261 and 262, the command issuing unit 224 issues, as commands without using the feature point information, the commands corresponding to the motions of the feature-point pointers 261 and 262, which are supplied from the command determination unit 223, namely, a command for changing the color of the feature-point pointers 261 and 262 and a command for fixing the positional relationship between the photograph 251 and the feature-point pointers 261 and 262.

Furthermore, for example, as shown in FIG. 34, in a case where the user increases the distance between their left hand grabbing the feature-point pointer 261 and their right hand grabbing the feature-point pointer 262 in horizontal direction, the command issuing unit 224 issues, as a command using the feature point information, the command corresponding to the motions of the feature-point pointers 261 and 262, which is supplied from the command determination unit 223, namely, a command for enlarging the photograph 251 in the horizontal direction in proportion to the increase based on the feature point information in accordance with a command for enlarging the photograph 251 without changing the positional relationship between the photograph 251 and the feature-point pointers 261 and 262.

If it is determined in step S67 that no command is to be issued, the process skips step S68 and proceeds to step S69. In step S69, as in the processing of step S21 shown in FIG. 21, the combining unit 225 determines whether or not to terminate the display of interface-related images. Specifically, the combining unit 225 determines whether or not a command for terminating the display of interface-related images has been supplied from the command issuing unit 224.

If it is determined in step S69 that the display of interface-related images is not to be terminated, the process returns to step S66. Then, the optical flows of the two feature points are calculated based on following two consecutive frames of the captured image stored in the frame buffer 32 and the feature point information on the two feature points, which has been updated at the previous iteration of the process. Then, the subsequent processing is performed.

If it is determined in step S69 that the display of interface-related images is to be terminated, then in step S70, the combining unit 225 terminates the display of the feature-point pointers and the captured image.

The processing of steps S71 to S73 is similar to the processing of steps S22 to S24 shown in FIG. 21, respectively, and will not be described herein.

In the foregoing description, the waving of a user's hand to the camera 12 is detected as a trigger. However, any other operation may be detected as a trigger. For example, in a case where the image processing apparatus 11 (or 111 or 211) is provided with a remote controller, an operation of a predetermined button provided on the remote controller may be detected as a trigger. In this case, area information indicating a predetermined area is output as the area information.

In the foregoing description, a corner point is extracted as a feature point. Alternatively, a point located on a contour line may be extracted as a feature point. In this case, any point located on a contour line may be extracted as a feature point, resulting in less stable positioning of a feature-point pointer than the extraction of a corner point as a feature point. However, once a user grabs the feature point with their hand, the feature point is positioned within the hand. Thus, as in the case where a corner point is extracted as a feature point, the image processing apparatus 11 (or 111 or 211) allows high recognition robustness and high-precision position detection with a minimum amount of processing.

In the foregoing description, furthermore, a method of calculating an optical flow of a feature point is used to detect a motion of the feature point. The motion of the feature point may be detected using any other method such as template matching.

In the specification, steps describing a program stored in a program recording medium may be executed in a time-series manner. The steps may not be necessarily executed in a time-series manner, and may be executed in parallel or individually.

Embodiments of the present invention are not limited to the foregoing embodiments, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   extracting means for extracting a feature point from a captured image;
   recognizing means for recognizing a position of the feature point;
   display control means for performing control, based on the position of the feature point, to display a feature-point pointer indicating the feature point, and a plurality of predetermined user interfaces;
   gesture recognizing means for recognizing a grab gesture, wherein a volume of space is enclosed within a user's palm, the volume of space corresponding to a volume of space surrounding the feature-point pointer; and
   issuing means for issuing, based on the position of the feature point, a command corresponding to the position of the feature point or a motion of the feature point,
   wherein the display control means displays the plurality of predetermined user interfaces in a predetermined pattern surrounding the feature-point pointer, and
   wherein the command issued by the issuing means is capable of terminating the display of the plurality of user interfaces, the termination being triggered by detection of a predetermined gesture that results in the feature-point pointer being moved from inside a circular region encompassing the plurality of user interfaces to outside said region.

2. The image processing apparatus according to claim 1,
   wherein the extracting means extracts a plurality of feature points from the captured image, and
   wherein the issuing means issues, for each of the feature points, based on a position of the feature point, a command corresponding to the position of the feature point or to a motion of the feature point.

3. The image processing apparatus according to claim 2,
   wherein the display control means performs control, for each of the feature points, based on a position of the feature point, to display a feature-point pointer indicating the feature point and predetermined user interfaces, and
   wherein the issuing means issues, for each of the feature points, based on a position of the feature point, a command corresponding to one of the user interfaces.

4. The image processing apparatus according to claim 3,
   wherein the display control means performs control, for each of the feature points, based on a position of the feature point, to display a feature-point pointer indicating the feature point, and to display predetermined user interfaces, the predetermined user interfaces being shared by the plurality of feature points, and
   wherein the issuing means issues, for each of the feature points, based on a position of the feature point, a command corresponding to one of the user interfaces.

5. The image processing apparatus according to claim 1,
   wherein the extracting means extracts a plurality of feature points from the captured image, and
   wherein the issuing means issues commands corresponding to positions or motions of the plurality of feature points.

6. An image processing method for an image processing apparatus configured to extract a feature point from a captured image, the image processing method comprising the steps of:
   extracting the feature point from the captured image;
   recognizing a position of the feature point;
   displaying, based on the position of the feature point, a feature-point pointer indicating the feature point, and a plurality of predetermined user interfaces;
   recognizing a grab gesture, wherein a volume of space is enclosed within a user's palm, the volume of space corresponding to a volume of space surrounding the feature-point pointer; and
   issuing, based on the position of the feature point, a command corresponding to the position of the feature point or to a motion of the feature point,
   wherein the plurality of predetermined user interfaces are displayed in a predetermined pattern surrounding the feature-point pointer, and
   wherein the command issued is capable of terminating the display of the plurality of user interfaces, the termination being triggered by detection of a predetermined gesture that results in the feature-point pointer being moved from inside a circular region encompassing the plurality of user interfaces to outside said region.

7. A program for causing a computer to execute image processing for extracting a feature point from a captured image, the image processing comprising the steps of:
   extracting the feature point from the captured image;
   recognizing a position of the feature point;
   displaying, based on the position of the feature point, a feature-point pointer indicating the feature point, and a plurality of predetermined user interfaces;
   recognizing a grab gesture, wherein a volume of space is enclosed within a user's palm, the volume of space corresponding to a volume of space surrounding the feature-point pointer; and
   issuing, based on the position of the feature point, a command corresponding to the position of the feature point or to a motion of the feature point,
   wherein the plurality of predetermined user interfaces are displayed in a predetermined pattern surrounding the feature-point pointer, and
   wherein the command issued is capable of terminating the display of the plurality of user interfaces, the termination being triggered by detection of a predetermined gesture that results in the feature-point pointer being moved from inside a circular region encompassing the plurality of user interfaces to outside said region.

8. An image processing apparatus comprising:
   an extracting unit configured to extract a feature point from a captured image;
   a recognizing unit configured to recognize a position of the feature point;
   a display control unit configured to perform control, based on the position of the feature point, to display a feature-point pointer indicating the feature point, and a plurality of predetermined user interfaces;
   a recognizing unit configured to recognize a grab gesture, wherein a volume of space is enclosed within a user's palm, the volume of space corresponding to a volume of space surrounding the feature-point pointer; and
   an issuing unit configured to issue, based on the position of the feature point, a command corresponding to the position of the feature point or to a motion of the feature point,
   wherein the display control unit displays the plurality of predetermined user interfaces in a predetermined pattern surrounding the feature-point pointer, and
   wherein the command issued by the issuing unit is capable of terminating the display of the plurality of user interfaces, the termination being triggered by detection of a predetermined gesture that results in the feature-point pointer being moved from inside a circular region encompassing the plurality of user interfaces to outside said region.

* * * * *